United States Patent
Wakashiro et al.

(10) Patent No.: US 6,430,482 B1
(45) Date of Patent: Aug. 6, 2002

(54) CONTROL APPARATUS FOR HYBRID VEHICLE

(75) Inventors: Teruo Wakashiro; Atsushi Matsubara; Shinichi Kitajima; Kazutomo Sawamura; Atsushi Izumiura; Hideyuki Oki, all of Wako (JP)

(73) Assignee: Honda Giken Kogyo Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/678,102

(22) Filed: Oct. 4, 2000

(30) Foreign Application Priority Data

Oct. 6, 1999  (JP) .............................................. 11-286111

(51) Int. Cl.⁷ .............................. H02J 7/14; H02P 9/00; H02P 5/20
(52) U.S. Cl. ......................... 701/22; 318/140; 318/139; 180/65.3
(58) Field of Search ........................... 701/22; 318/140, 318/139, 141; 180/65.3, 65.4, 205, 220, 65.1; 322/13, 29, 7, 28, 32; 307/10.1, 16, 71, 84, 131; 320/104

(56) References Cited

U.S. PATENT DOCUMENTS

| | | | | |
|---|---|---|---|---|
| 4,780,619 A | * | 10/1988 | Campbell et al. ......... | 307/10 R |
| 5,021,727 A | * | 6/1991 | Mashino ......................... | 322/7 |
| 5,334,926 A | * | 8/1994 | Imaizumi ...................... | 320/15 |
| 5,389,825 A | * | 2/1995 | Ishikawa et al. ........... | 307/10.1 |
| 5,550,457 A | * | 8/1996 | Kusase et al. ................ | 322/29 |
| 5,621,304 A | * | 4/1997 | Kiuchi et al. ................. | 322/18 |
| 5,971,090 A | * | 10/1999 | Tanaka et al. ............... | 180/205 |
| 6,020,697 A | * | 2/2000 | Shimasaki et al. .......... | 318/140 |
| 6,109,237 A | * | 8/2000 | Pels et al. .............. | 123/339.19 |

FOREIGN PATENT DOCUMENTS

JP          07-123509          5/1995

* cited by examiner

Primary Examiner—Tan Nguyen
Assistant Examiner—Dalena Tran
(74) Attorney, Agent, or Firm—Armstrong, Westerman & Hattori, LLP

(57) ABSTRACT

A control apparatus for a hybrid vehicle which increases electric power supply to a power storage unit to reduce the discharge amount from the power storage unit in the case where electric power consumption of the low voltage system is increased. There are provided: a vehicle speed sensor, an engine speed sensor, a FIECU for computing the electric power consumption of a low voltage system such as a low voltage power storage unit and engine accessories, a high electric power consumption determining device for determining whether a situation where the low voltage system electric power consumption exceeds a predetermined value has continued for a certain duration, a regeneration amount increasing device for, in the case where the vehicle speed is within a predetermined range, and the engine speed is greater than a predetermined speed, increasing the regeneration amount by the motor depending on the low voltage system electric power consumption, a generation amount increasing device for increasing the generation amount by the motor depending on low voltage system electric power consumption, and a determination threshold value correcting device for, in the case where it is determined by the high electric power consumption determining device that a situation where the low voltage system electric power consumption is above a predetermined value has continued for a certain duration, raising the determination threshold value which is the basis of approval or denial of output assistance depending on the low voltage system electric power consumption.

6 Claims, 21 Drawing Sheets

KPBRGN/KPBRGTH COMPUTATION

KPBRGN/KPBRGTH table

MASTTHL/H table

PA CORRECTION (DTHAPA) table

DTHVEL table

KVDTHAST table

CONTROL APPARATUS FOR HYBRID VEHICLE

BACKGROUND OF THE INVENTION

1. Field of the Invention

The present invention relates to a control apparatus for a hybrid vehicle driven by an engine and a motor. In particular the invention relates to a control apparatus for a hybrid vehicle, which enables appropriate energy management of a high voltage power storage unit for driving a motor depending on 12V electric power consumption.

This application is based on Japanese Patent Application No. Hei 11-286111 (Unpublished), the contents of which are incorporated herein by reference.

2. Description of the Related Art

Heretofore there is known a hybrid vehicle incorporating a motor in addition to an engine as a drive source for driving vehicle.

For one type of such hybrid vehicle, there is a parallel hybrid vehicle where the motor is used as an auxiliary drive source for assisting the output from the engine. With this parallel hybrid vehicle, for example at the time of acceleration, the engine is drive assisted by means of the motor, while at the time of deceleration, various control is carried out such as performing charging of a battery by deceleration regeneration, so that the electrical energy (hereinafter remaining charge) of the battery can be maintained to satisfy the requirements of the driver (for example, as disclosed in Japanese Unexamined Patent Application, First Publication No. Hei 7-123509.)

The battery of the high voltage system that is generally installed in the abovementioned conventional parallel hybrid vehicle, supplies electric power to a motor that is mainly an auxiliary drive to the engine, and stores the regenerative electric power supplied from the motor at the time of deceleration regeneration. However, there is a case where, for example, the remaining charge of this high voltage system battery is affected by electric power consumption of the 12V system, such as for engine accessories, headlamps and an air conditioner.

For example, when electric power consumption of the 12V system increases, a portion of the electric power that is supposed to be supplied to the high voltage system battery by deceleration regeneration, is directed to the electric power consumption of the 12V system, and electric power to be supplied to the battery of the high voltage system is decreased. Furthermore, there is a case where, when drive assistance is performed from the high voltage system battery to accelerate, if a portion is supplied to electric power consumption of the 12V system, the remaining charge is decreased by that portion.

To deal with these, it is possible to solve the abovementioned problems by enhancing this high voltage system battery so as to avoid detriment to the high voltage system battery, or to increase the capacity of the 12V system battery to provide a margin for energy management of the electric power consumption of the 12V system. However, there is a problem in that the weight of the high voltage battery or the 12V system battery is increased, which increases the vehicle weight.

SUMMARY OF THE INVENTION

Therefore, this invention provides a control apparatus for a hybrid vehicle which increases electric power for supplying the power storage unit, and also suppresses the discharge amount from the power storage unit, depending on the low voltage system power consumption.

With the first aspect of the present invention, a control apparatus for a hybrid vehicle which is provided with: an engine (for example, an engine E in an embodiment) for outputting a, driving force for a vehicle, a motor (a motor M) for assisting the output from the engine, a high voltage power storage unit (a battery 3) for supplying electric power to the motor, a voltage converter (a downverter 5) for lowering the voltage of the high voltage power storage unit to enable supply of electric power to a low voltage system such as a low voltage power storage unit (an auxiliary battery 4) and engine accessories, comprising: an electric power computing device (FIECU 11) for computing the electric power consumption of the low voltage system; and a storage amount controller for preventing the decrease of the storage amount of the high voltage power storage unit depending on the electric power consumption of the low voltage system.

With the second aspect of the present invention, the hybrid vehicle is further provided with a regeneration controller (a motor ECU 1) for setting a regeneration amount by the motor at the time of vehicle deceleration, to perform regeneration by the motor on the basis of the regeneration amount; and the storage amount controller is further provided with a vehicle speed detector (a vehicle speed sensor S1), an engine speed detector (an engine speed sensor S2) for detecting the engine speed of the engine, and a regeneration amount increasing device (step S407) for, when the vehicle speed (a control vehicle speed VP) detected by the vehicle speed detector is within a predetermined range (within the range set in step S404 and step S405), and the engine speed detected by the engine speed detector is greater than a predetermined speed (a predetermined value #NPRGELL), increasing the regeneration amount set by the regeneration controller, depending on the electric power consumption of the low voltage system.

With the third aspect of the present invention, the hybrid vehicle is further provided with an output assistance determining device (steps S122, S135) for determining, on the basis of a determination threshold value (an air intake passage pressure assistance trigger threshold value MAST, a throttle assistance trigger threshold value MTHAST, an air intake passage pressure assistance trigger threshold value MASTTH), approval or denial of output assistance of the engine by the motor, depending on the driving conditions of the vehicle, an output assistance controller (a motor ECU 1) for, when the output assistance determining device determines that output assistance of the engine by the motor is performed, setting the control amount of the motor to perform output assistance of the engine by the motor, and a generation controller (a motor ECU 1) for, when the output assistance determining device determines that output assistance of the engine by the motor is not performed, setting the generation amount by the motor to perform generation by the motor; and the storage amount controller is further provided with a generation amount increasing device (step S319) for increasing the generation amount set by the generation controller, depending on the electric power consumption of the low voltage system.

With the fourth aspect of the present invention, the hybrid vehicle is further provided with an output assistance determining device (steps S122, S135) for determining, on the basis of a determination threshold value (an air intake passage pressure assistance trigger threshold value MAST, a throttle assistance trigger threshold value MTHAST, an air intake passage pressure assistance trigger threshold value MASTTH), approval or denial of output assistance of the engine by the motor, depending on the driving conditions of the vehicle, and an output assistance controller (a motor ECU 1) for, when the output assistance determining device determines that output assistance of the engine by the motor is performed, setting the control amount of the motor to perform output assistance of the engine by the motor; and the storage amount controller is further provided with a high electric power consumption determining device (step S165) for determining whether a situation in which the electric power consumption of the low voltage system exceeding a predetermined value (a predetermined value #VELMAH) has continued for a certain duration (a predetermined value #TMELMA), and a determination threshold value correcting device (steps S158, S169, S198) for, when it is determined by the high electric power consumption determining device that a situation in which the electric power consumption of the low voltage system exceeding a predetermined value has continued for a certain duration, raising the determination threshold value which is the basis of approval or denial of output assistance by the output assistance determining device, depending on the electric powers consumption of the low voltage system.

With such constructions, depending on the electric power consumption of the low voltage system, the regeneration amount increasing device increases, for example, the regenerative electric power at the time of deceleration regeneration, so that it is possible to avoid a decrease of the supply amount of regenerative electric power to the high voltage power storage unit. Furthermore, depending on the electric power consumption of the low voltage system, the generation amount increasing device increases, for example the generation amount at the time of cruise, so that it is possible to increase the storage amount of the high voltage power storage unit in advance. Moreover, when the current consumption of the low voltage system is increased to greater than a predetermined value by the high electric power consumption determining device, by raising the determination threshold value of the output assistance for the engine from the motor output by means of the determination threshold value correcting device, for example, the frequency of the accelerating mode can be decreased and the frequency of cruise mode increased. Therefore, there is an effect in that the drop of the storage amount of the high voltage power storage unit due to the electric power consumption of the low voltage system is prevented, which enables appropriate energy management to be realized.

A fifth aspect of the invention is characterized in that the storage amount controller is further provided with a vehicle speed detector (a vehicle speed sensor S1), and the determination threshold value to be corrected by the determination threshold value correcting device is corrected depending on the vehicle speed (a control vehicle speed VP) detected by the vehicle speed detector (steps S157, S168, S197).

With such a construction, even when sufficient regenerative electric power cannot be maintained due to repeated starting and stopping at the time of low vehicle speed such as with traffic congestion, depending on the vehicle speed, for example, by raising the determination threshold value as the vehicle speed becomes lower, the frequency of acceleration mode can be further decreased and the frequency of cruise mode further increased. Consequently, there is an effect in that the drop of the storage amount of the high voltage power storage unit can be reliably prevented.

With the sixth aspect of the invention, by computing the low voltage system electric power consumption from the electric power downstream of the high voltage power storage unit and, upstream of the voltage converter, correction of the efficiency due to the temperature of the voltage converter is unnecessary. Therefore, there is an effect in that the low voltage system electric power consumption can be computed with high accuracy.

With the seventh aspect of the invention, by computing the low voltage system electric power consumption from the difference in the electric power between the upstream and downstream of the high voltage power storage unit, it is not necessary to specially install a detecting device upstream of the voltage converter. Therefore, there is an effect in that low cost can be expected.

With the eighth aspect of the invention, by computing the low voltage system electric power consumption from the ammeter (a current sensor S9) used in the fuel injection system, and the voltage of the low voltage power storage unit, the ammeter used in the fuel injection system is effectively utilized to enable high accuracy measurement. Therefore, there is an effect in that the accuracy of energy management can be improved.

BRIEF DESCRIPTION OF THE DRAWINGS

FIG. 32 is a graph for obtaining deceleration regeneration correction amount when a brake of an MT vehicle is on.

FIG. 33 is a graph for obtaining deceleration regeneration correction amount when a brake of a CVT vehicle is on.

FIG. 35 is a graph for obtaining deceleration regeneration correction amount depending on the 12V system electric power consumption when a brake is on.

DESCRIPTION OF THE PREFERRED EMBODIMENTS

Hereinafter is a description of embodiments of this invention with reference to figures.

Figure 1:
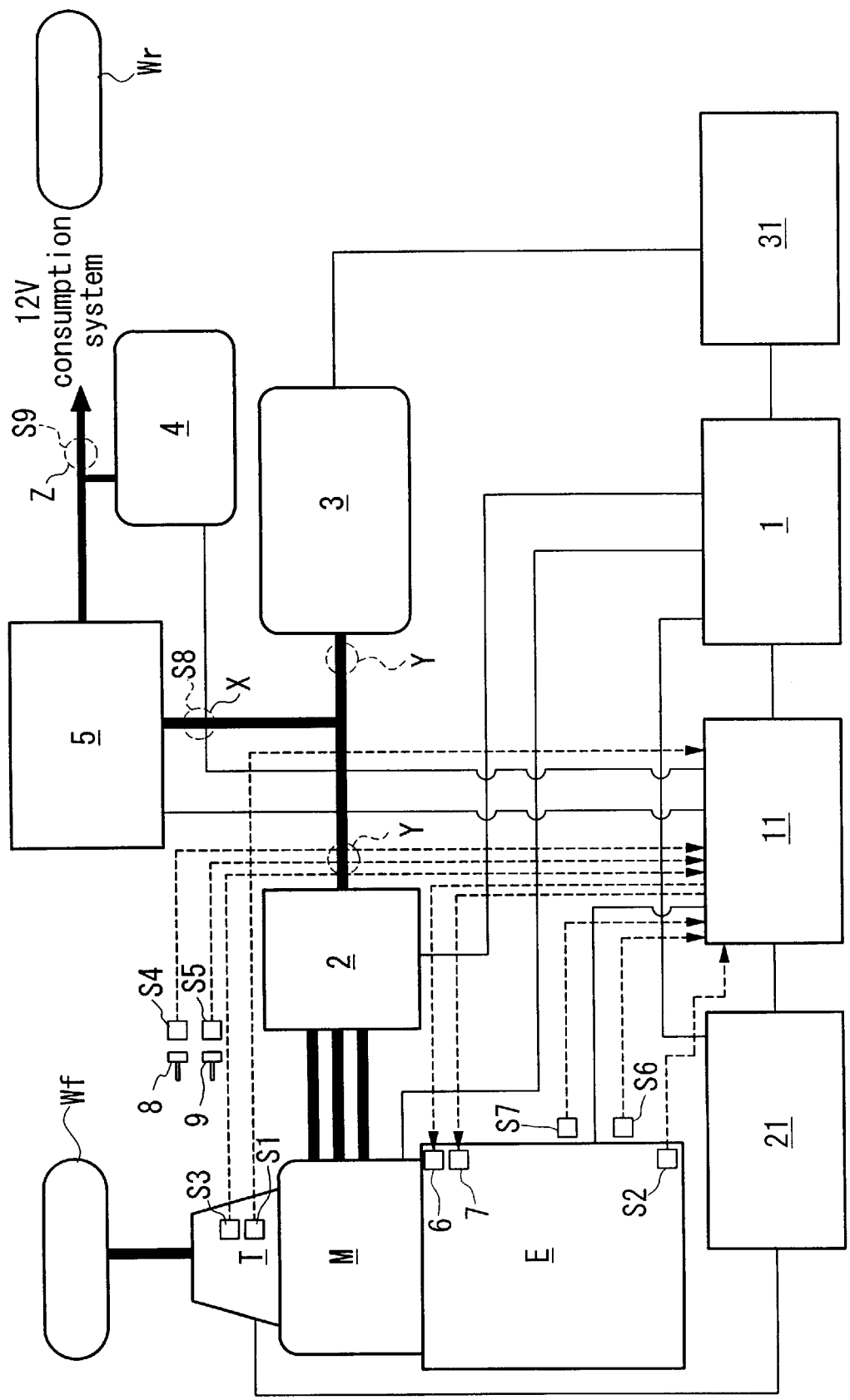
FIG. 1 is a configuration diagram of a hybrid vehicle.

FIG. 1 shows an embodiment applied to a parallel hybrid vehicle. The driving force from both an engine E and a motor M is transmitted to front wheels Wf, Wf (only one side shown in FIG. 1) serving as drive wheels via a transmission T comprising either an automatic transmission or a manual transmission. Furthermore, when a driving force is transmitted to the motor M side from the front wheels Wf, Wf at the time of deceleration of the hybrid vehicle, the motor M functions as a generator to produce so called regenerative braking force, and the kinetic energy of the vehicle is recovered as electrical energy.

The drive and regeneration of the motor M is performed by a power drive unit 2, which receives control instructions from the motor ECU 1. A battery 3 of a high voltage system for transferring electrical energy to and from the motor M is connected to the power drive unit 2. The battery 3 is constructed from individual modules where, for example a plurality of cells, is connected in series, with a plurality of these modules connected in series. Mounted on the hybrid vehicle is a 12 volt auxiliary battery 4 for driving various accessories. This auxiliary battery 4 is connected to the battery 3 via a downverter 5. The downverter 5, which is controlled by the FIECU 11, reduces the voltage of the battery 3 for charging the auxiliary battery 4.

The FIECU 11, in addition to the motor ECU 1 and the downverter 5, controls the operation of a fuel supply amount control device 6 for controlling the fuel supply amount to the engine E, the operation of a starter motor 7, and also the ignition timing. Therefore, inputs to the FIECU 11 are: a signal from a vehicle speed sensor S1 for detecting the vehicle speed V based on the revolution speed of a drive shaft in the transmission T, a signal from an engine speed sensor S2 for detecting engine speed NE, a signal from a shift position sensor S3 for detecting the shift position of the transmission T, a signal from a brake switch S4 for detecting operation of a brake pedal 8, a signal from a clutch switch S5 for detecting the operation of a clutch pedal 9, a signal from a throttle opening sensor S6 for detecting degree of throttle opening (e.g. extent of the throttle opening) TH, and a signal from an air intake passage pressure sensor S7 for detecting air intake passage pressure PB. Furthermore, in the figure, a reference numeral 21 denotes a CVTECU for CVT control, and 31 denotes the battery ECU which protects the battery 3, and computes the remaining charge (state of charge) SOC of the battery 3.

Here, to estimate the 12V system electric power consumption in the figure, a current sensor S8 can be installed on the upstream side (X) of the downverter 5, or the current value and voltage value can be measured on the downstream side (Y) of the power drive unit 2 and on the upstream side (Y) of the battery 3, or the measurement value of the current sensor S9 (existing sensor used for the fuel supply system) on the downstream side (Z) of the auxiliary battery 4 used for the fuel supply system, and the voltage of the auxiliary battery 4 can be measured.

In the case where the current sensor S8 is installed in the position (X), it is possible to obtain the electric power consumption from the voltage and current upstream of the downverter 5. In this case, it is not necessary to estimate efficiency due to temperature of the downverter 5, thus enabling high accuracy estimation of the 12V system consumption.

Furthermore, in the case where current value and voltage value are measured in the abovementioned locations (Y), electric power consumption is derived from the difference between the current-voltage of the battery 3, and the current-voltage downstream of the power drive unit 2. In this case, it is not necessary to install a sensor on the upstream side of the downverter 5, thus enabling a cost reduction.

Furthermore, in the case where measurement is made by installing the current sensor S9 to measure current value in the position (Z), and using the voltage of the auxiliary battery 4, since this current sensor S9 is initially used for the fuel supply system, high accuracy measurement is possible, which is an advantage.

[Motor Operating Mode Determination]

This hybrid vehicle has control modes: "idle stop mode", "idle mode", "deceleration mode", "acceleration mode" and "cruise mode".

Figure 2:
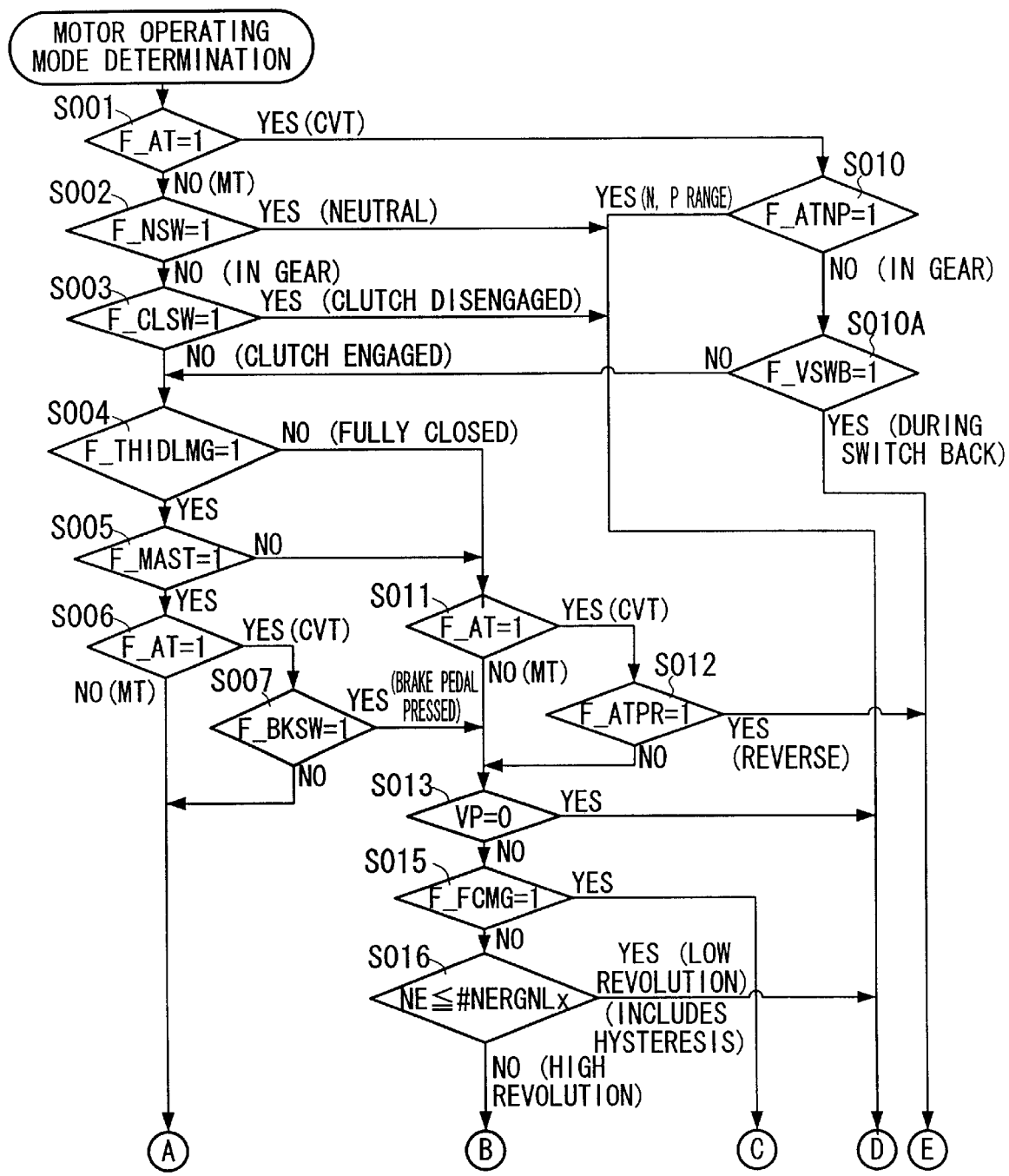
FIG. 2 is a flow chart showing motor operating mode determination
Figure 3:
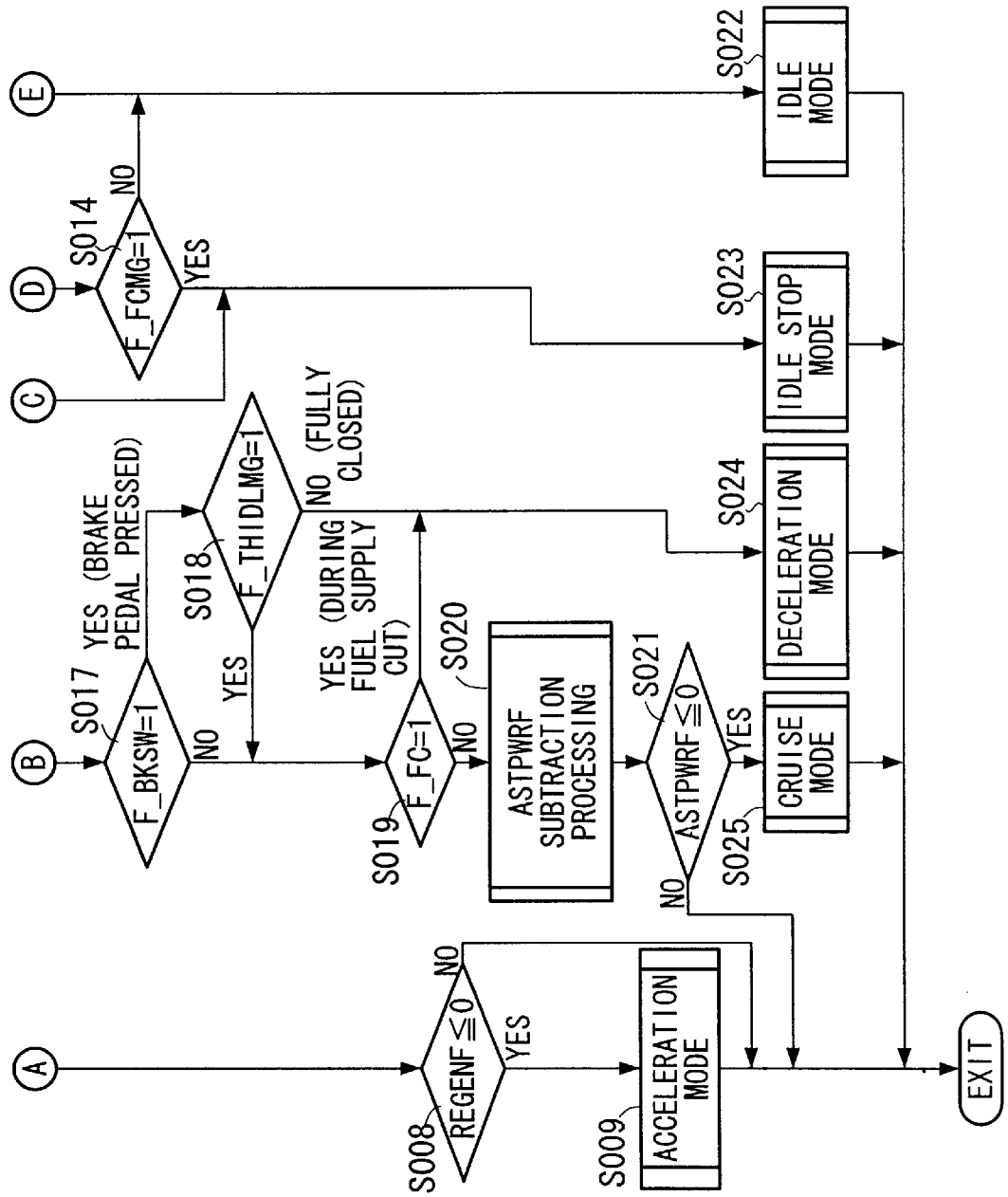
FIG. 3 is a flow chart showing motor operating mode determination.

Next is a description of the processing of motor operating mode determinations which determine each of the modes, based on the flow chart of FIG. 2 and FIG. 3.

In step S001, it is determined whether the flag setting of an MT/CVT determination flag F_AT is "1". In the case where the determination result is "NO", that is, it is determined to be an MT (manual transmission) vehicle, the flow proceeds to step S002. In the case where the determination result of step S001 is "YES", that is, it is determined to be a CVT (continuously variable transmission) vehicle, the flow proceeds to step S010. Here, it is determined whether the flag setting of a CVT in gear determination flag F_ATNP is "1". In the case where the determination result in step S010 is "NO", that is, it is determined to be in gear, the flow proceeds to step S010A, and it is determined whether it is during switchback (during shift lever operation) by the condition of a switchback flag F_VSWB. As the determination result, in the case where it is during switchback, the flow proceeds to step S022, shifts to "idle mode", and terminates. In idle mode, fuel supply is resumed after fuel supply cut to maintain the engine E in an idle state. In this idle mode, when the 12V system current consumption increases, supplementary electric power is supplied from the battery 3.

In the case where the determination result of step S010A is that it is not during switchback, the flow proceeds to step S004.

Furthermore, in the case where the determination result of step S010 is "YES", that is, it is determined to be N, P range, the flow proceeds to step S014, and it is determined whether the flag setting of an engine stop control execution flag F_FCMG is "1". In the case where the determination result of step S014 is "NO", control shifts to "idle mode" in step S022, and terminates. In step S014, in the case where it is determined that the flag setting is "1", the flow proceeds to step S023, shifts to "idle stop mode", and control then terminates. In the idle stop mode, for example at the time the vehicle is stopped, the engine is stopped in a defined condition.

In step S002, it is determined whether the flag setting of a neutral position determination flag F_NSW is "1". In the case where the determination result of step S002 is "YES", that is, it is determined to be in neutral position, the flow proceeds to step S014. In the case where the determination result of step S002 is "NO", that is, it is determined to be in gear, the flow proceeds to step S003, and here it is determined whether the flag setting of a clutch connection determination flag F_CLSW is "1". In the case where the determination result is "YES", so that it is determined that the clutch is disengaged, the flow proceeds to step S014. In the case where the determination result of step S003 is "NO", so that it is determined th t the clutch is engaged, the flow proceeds to step S004.

In step S004, it is determined whether the flag setting of an IDLE determination flag F_THIDLMG is "1". In the case where the determination result is "NO", that is, it is determined that the throttle is fully closed, the flow proceeds to step S011. In the case where the determination result of step S004 is "YES", that is, it is determined that the throttle is not fully closed, the flow proceeds to step S005, and it is determined whether the flag setting of a motor assistance determination flag F_MAST is "1".

In the case where the determination result of step S005 is "NO", the flow proceeds to step S011. In the case where the determination result of step S005 is "YES", the flow proceeds to step 8006.

In step S011, it is determined whether the flag setting of the MT/CVT determination flag F_AT is "1". In the case where the determination result is "NO", that is, it is determined to be an MT vehicle, the flow proceeds to step S013. In the case where the determination result of step S011 is "YES", that is, it is determined to be a CVT vehicle, the flow proceeds too step S012, and it is determined whether the flag setting of a reverse position determination flag F_ATPR is "1". In the case where the determination result is "YES", that is, it is in reverse position, the flow proceeds to step S022. In the case where the determination result is "NO", that is, it is determined to be other than in reverse, the flow proceeds to step S013.

In step S006, it is determined whether the flag setting of the MT/CVT determination flag F_AT is "1" In the case where the determination result is "NO", that is, it is determined to be an MT vehicle, in step S008 it is determined whether the final charge instruction value REGENF is less than or equal to "0". In the case where it is determined to be less than or equal to "0", the flow proceeds to step S009, "acceleration mode", and terminates. In step S008, in the case where the final charge instruction value REGENF is greater than "0", control terminates. In this "acceleration mode", when the 12V system current consumption becomes high, a part of the electric power to be used for assisting the drive of the engine E is directed from the battery 3 to the 12V system electric power consumption.

In the case where the determination result of step S006 is "YES", that is, it is determined to be a CVT vehicle, the flow proceeds to step S007, and it is determined whether the flag setting of the brake ON determination flag F_BKSW is "1". In the case where the determination result of step S007 is "YES", that is, it is determined that the brake pedal is pressed, the flow proceeds to step S013. In the case where the determination result of step S007 is "NO", that is, it is determined that the brake pedal is not pressed, the flow proceeds to step S008.

In step S013, it is determined whether the engine control vehicle speed VP is "0". In the case where the determination result is "YES", that is, it is determined that the vehicle speed is 0, the flow proceeds to step S014. In the case where the determination result of step S013 is "NO", that is, it is determined that the vehicle speed is not "0", the flow proceeds to step S015. In step S015 it is determined whether the flag setting of the engine stop control execution flag F_FCMG is "1". In the case where the determination result of step S015 is "NO", the flow proceeds to step S016. In step S015, in the case where it is determined that the flag setting is "1", the flow proceeds to step S023.

In step S116, the engine speed NE and the cruise/deceleration mode lower limit engine speed #NERGNLx are compared. Here, "x" in the cruise/deceleration mode lower limit engine speed #NERGNLx is a value (including hysteresis) set for each gear.

In the case where the determination result of step S016 is that the engine speed NE≦the cruise/deceleration mode lower limit engine speed #NERGNLx, that is, it is determined to be revolving slowly, the flow proceeds to step S014. On the other hand, in the case where the determination result of step S016 is that the engine speed NE>the cruise/deceleration mode lower limit engine speed #NERGNLx, that is, it is determined to be revolving quickly, the flow proceeds to step S017. In step S017, it is determined whether the flag setting of the brake ON determination flag F_BKSW is "1". In the case where the determination result is "YES", that is, it is determined that the brake pedal is pressed, the flow proceeds to step S018. In the case where the determination result instep S017 is "NO", that is, it is determined that the brake pedal is not pressed, the flow proceeds to step S019.

In step S018, it is determined whether the flag setting of the IDLE determination flag F_THIDLMG is "1". In the case where the determination result is "NO", that is, it is determined that the throttle is fully closed, the flow proceeds to "deceleration mode" in step S024, and terminates. Here, with the deceleration mode, regenerative braking by the motor M is performed. In the case where the determination result of step S018 is "YES", that is, the throttle is not fully closed, the flow proceeds to step S019. With this "deceleration mode", if the 12V system current consumption is high, a part of the regenerative electric power to the battery 3 is directed to the 12V system consumption.

In step S019, it is determined whether the flag setting of the fuel supply cut execution flag F_FC is "1". In the case where the determination result is "YES", that is, it is determined that the fuel supply is stopped, the flow proceeds to step S024. In the case where the determination result of step S019 is "NO", the flow proceeds to S020, and subtraction processing for the final assistance instruction value ASTPWRF is performed. Then, in step S021, it is determined whether the final assistance instruction value ASTPWRF is less than or equal to zero. In the case where it is determined to be less than or equal to zero, the flow proceeds to "cruise mode" in step S025. With this cruise mode, the motor M is not driven so that the vehicle runs under the driving force of the engine E. In step S021, if the final assistance instruction value ASTPWRF is determined to be greater than "0", control terminates.

In this manner, the motor operating mode is determined to perform control depending on each mode. In the case where the 12V system electric power consumption is high, acceleration mode, deceleration (regeneration) mode, and idle stop mode are affected.

That is to say, in the case where the engine is drive assisted by the motor in acceleration mode, since a part of the electric power from the battery 3 is directed to the 12V system electric, power consumption via the downverter 5, in the case where electric power of this 12V consumption system is high, the amount taken from the battery 3 is increased. Furthermore, in deceleration mode, since the regeneration amount is fixed to create the perception of constant deceleration, when the 12V system electric power consumption is increased, the regeneration amount to be allotted to the battery 3 cannot be fully maintained.

Accordingly, in the case where the abovementioned 12V system current consumption (electric power consumption) is high, to solve the abovementioned problem, the following counter plans are devised in assistance trigger determination, cruise mode and deceleration mode.

[Battery Remaining Charge SOC Zoning]

First is a description of zoning (so called zone dividing of remaining charge) of the battery remaining charge SOC, which has a major influence on each mode. The battery remaining charge is computed by the battery ECU 31, for example, by voltage, discharge current, temperature, etc.

To explain one example, with zone A (from SOC 40% to SOC 80% through 90%) being a normal use zone as a base, zone B (from SOC 20% to SOC 40%) being a temporary use zone is positioned below this, and zone C (from SOC 0% to SOC 20%) being an over-discharge zone further below this. Above zone A is zone D (from SOC 80% through 90% to SOC 100%), being an overcharge zone.

Regarding the detection of battery remaining charge SOC in each zone, in zones A and B this is performed by the integration of current value, and in zones C and D this is performed by detecting voltage value and the like due to the characteristics of the battery.

Here, the boundary of each zone is defined by upper and lower threshold values, and hysteresis is set to these threshold values, which are arranged to be different between the times of increasing and decreasing of the battery remaining charge SOC.

[Assistance Trigger Determination]

Figure 4:
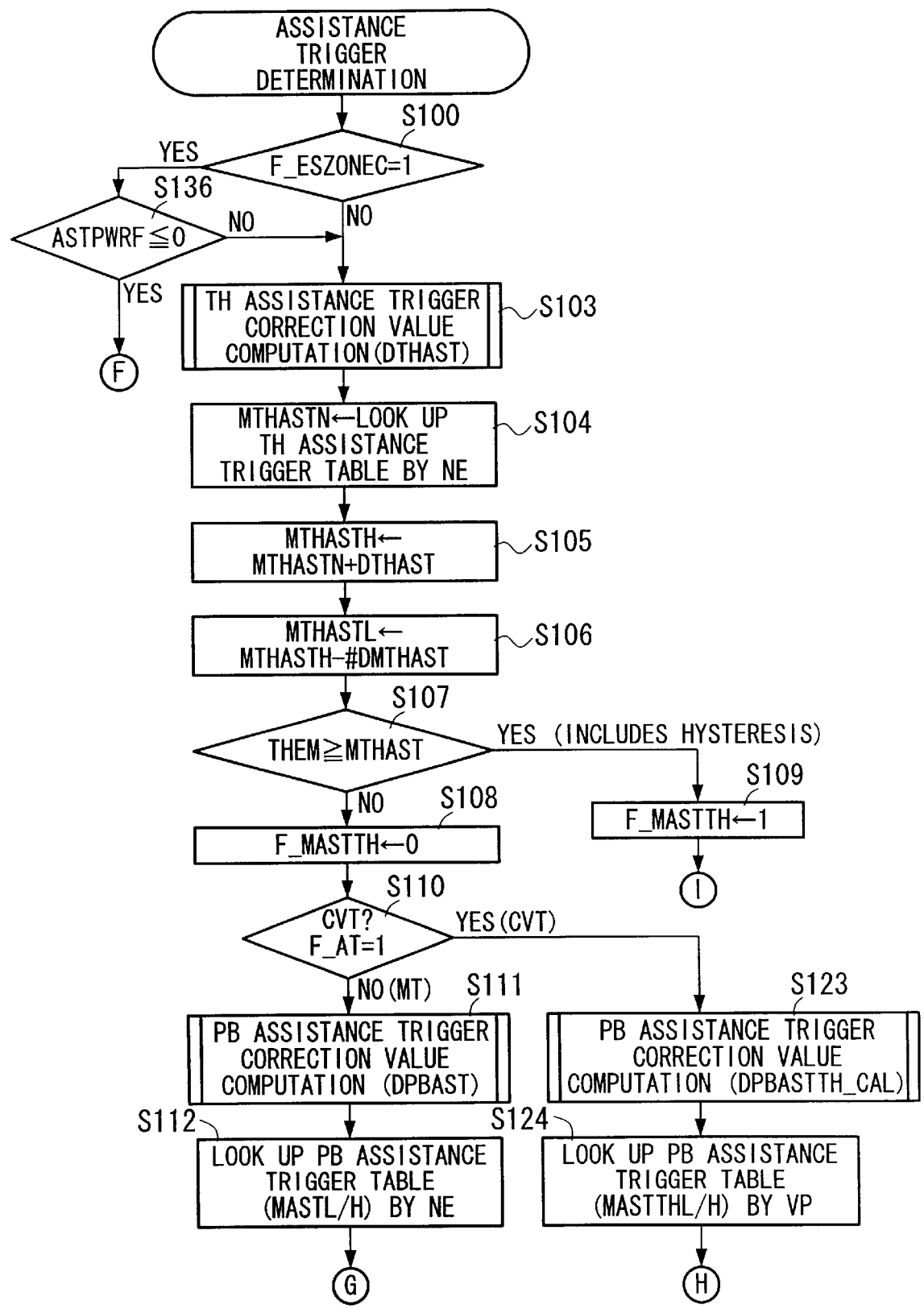
FIG. 4 is a flow chart showing assistance trigger determination.
Figure 5:
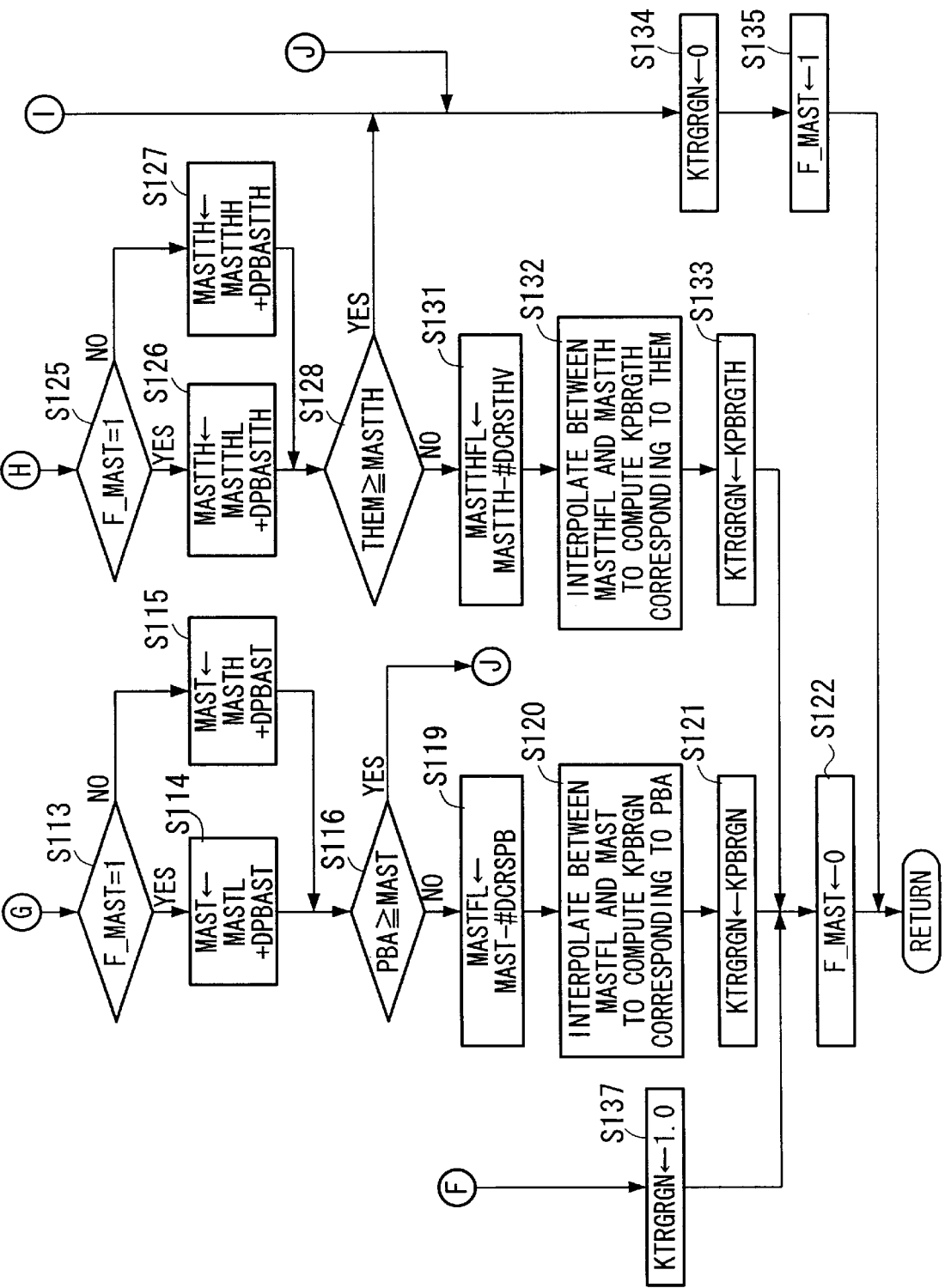
FIG. 5 is a flow chart showing assistance trigger determination.

FIG. 4 and FIG. 5 show flow charts for assistance trigger determination, to be specific, flow charts for determining assistance/cruise mode according to the zones.

In step S100, it is determined whether the flag setting of an energy storage zone C flag F_ESZONEC is "1". In the case where the determination result is "YES", that is, it is determined that the battery remaining charge SOC is in zone C, then in step S136 it is determined whether the final assistance instruction value ASTPWRF is less than or equal to "0". In the case where the determination result in step S136 is "YES", that is, it is determined that the final assistance instruction value ASTPWRF is less than or equal to "0", in step S137 a "1.0" is assigned to the cruise generation amount subtraction coefficient KTRGRGN, and in step S122 a "0" is assigned to the motor assistance determination flag F_MAST, and control returns.

In the case where both the determination results of step S100 and step S136 are "NO", the process of computing the throttle assistance trigger correction value DTHAST is performed in step S103. The details of the process will be described later.

Next, in step S104 a threshold value MTHASTN, being a reference for the throttle assistance trigger, is looked up from a throttle assistance trigger table. In this throttle assistance trigger table, as shown by the solid line in FIG. 6, the threshold value MTHASTN for the degree of throttle opening, being the basis of a determination of whether the motor assistance is applied in accordance with the engine speed NE, is determined, whereby the threshold value is set depending on the engine speed NE.

Figure 6:
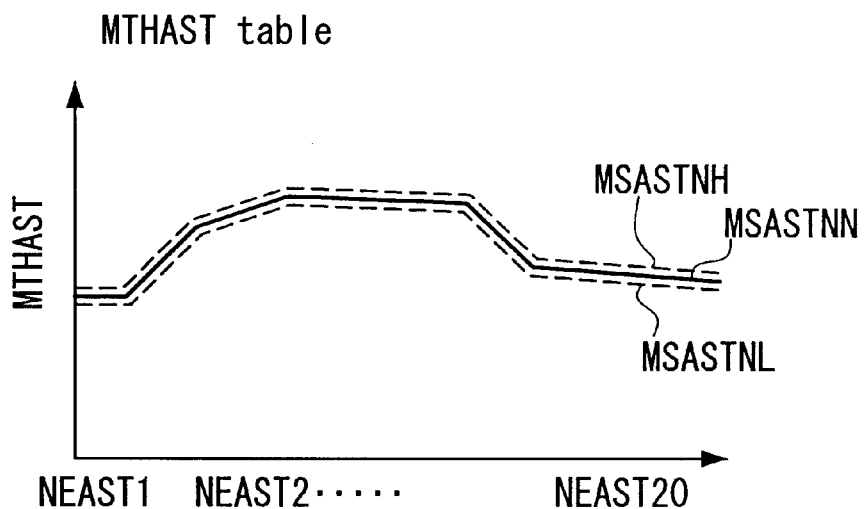
FIG. 6 is a graph showing threshold value of TH assistance mode and PB assistance mode.

Next, in step S105 and step S106, the correction value DTHAST computed in the aforementioned step S103 is added to the throttle assistance trigger reference threshold value MTHASTN obtained in step S104 to obtain a high throttle assistance trigger threshold value MTHASTH. Furthermore, the difference #DMTHAST for setting the hysteresis is subtracted from this high throttle assistance trigger threshold value MTHASTH to obtain a low throttle assistance trigger threshold value MTHASTL. When these high and low throttle assistance trigger threshold values are written over the standard threshold value MTHASTN in the throttle assistance trigger table, this is as shown in FIG. 6 by broken lines.

Then, in step S107 it is determined whether the degree of throttle opening current value THEM is greater than or equal to the throttle assistance trigger threshold value MTHAST obtained in step S105 and step S106. The throttle assistance trigger threshold value MTHAST in this case is a value with the aforementioned hysteresis. In the case where the degree of throttle opening is increasing, the high throttle assistance trigger threshold value MTHASTH is used, and in the case where the degree of throttle opening is decreasing, the low throttle assistance trigger threshold value MTHASTL is used.

In the case where the determination result in step S107 is "YES", that is, in the case where the degree of throttle opening current value THEM is greater than or equal to the throttle assistance trigger threshold value MTHAST (threshold value with high and low hysteresis set), the flow proceeds to step S109. In the case where the determination result is "NO", that is, in the case where the degree of throttle opening current value THEM is not greater than or equal to the throttle assistance trigger threshold value MTHAST (threshold value with high and low hysteresis set), the flow proceeds to step S108.

In step S109, a "1" is set to the throttle motor assistance determination flag F_MASTTH, on the other hand, in step S108, a "0" is set to the throttle motor assistance determination flag F_MASTTH.

The processing so far has been for determining whether the degree of throttle opening TH is an opening requiring motor assistance. In the case where the degree of throttle opening current value THEM in step S107 is determined to be greater than or equal to the throttle assistance trigger threshold value MTHAST, a "1" is set to the throttle motor assistance determination flag F_MASTTH, and by referring this flag in the aforementioned "acceleration mode", it is determined that motor assistance is required.

On the other hand, in step S108 where the throttle motor assistance determination flag F_MASTTH is set to "0", this indicates that the degree of throttle opening is determined to be outside the region requiring motor assistance. In this embodiment, the arrangement is such that assistance trigger determination is determined by both the degree of throttle opening TH and the engine air intake passage pressure PB. In the case where the degree of throttle opening current value THEM is greater than or equal to the throttle assistance trigger threshold value MTHAST, assistance determination is performed by the degree of throttle opening TH, and in the region where this threshold value is not exceeded, the determination is performed by the air intake passage pressure PB mentioned later. Then, after a "1" is set to the throttle motor assistance determination flag F_MASTTH in step S109, the flow proceeds to step S134 in order to leave normal assistance determination, and a "0" is set to the cruise generation amount subtraction coefficient KTR-GRGN. In the next step, S135, a "1" is set to the motor assistance determination flag F_MAST, and control returns.

On the other hand, in step S110 it is determined whether the flag setting of the MT/CVT determination flag F_AT is "1". In the case where the determination result is "NO", that is, it is determined to be an MT vehicle, the flow proceeds to step S111. In the case where the determination result of step S110 is "YES", that is, it is determined to be a CVT vehicle, the flow proceeds to step S123. In step S111 the computation processing for the air intake passage pressure assistance trigger corrected value DPBAST is performed. The details of the processing are described later.

Figure 7:
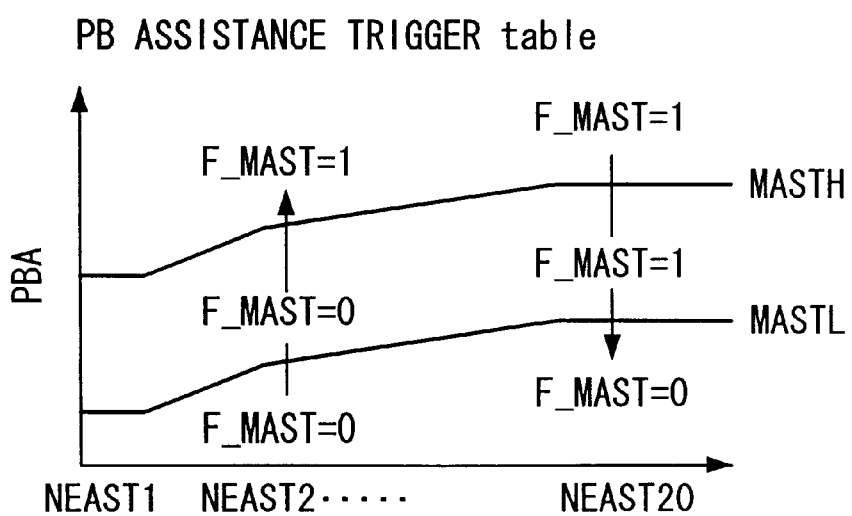
FIG. 7 is a graph showing threshold value of an MT vehicle in PB assistance mode.

Next, in step S112, air intake passage pressure assistance trigger threshold value MASTL/H is looked up from an air intake passage pressure assistance trigger table. In this air intake passage pressure assistance trigger table, as shown by two solid lines in FIG. 7, the high air intake passage pressure assistance trigger threshold value MASTH and the low air intake passage pressure assistance trigger threshold value MASTL for determining whether the motor assistance is applied in accordance with the engine speed NE are fixed. The arrangement is such that in the looking-up process of step S112, depending on the increase of the air intake passage pressure PBA, or depending on the decrease of the engine speed NE, when the high threshold value line MASTH in FIG. 7 is passed from below to above, the motor assistance determination flag F_MAST is changed from "0" to "1". Conversely, depending on the decrease of the air intake passage pressure PBA, or depending one the increase of the engine speed NE, when the low threshold value line MASTL is passed from above to below, the motor assistance determination flag F_MAST is changed from "1" to "0". Here, FIG. 7 performs switching at each gear and each stoichiometric/lean burn.

Then, in the next step S113 it is determined whether the flag setting of the motor assistance determination flag F_MAST is "1". In the case where the determination result is "1", the flow,proceeds to step S114, and in the case where the determination result is not "1", the flow proceeds to step S115. Then in step S114 the air intake passage pressure assistance trigger threshold value MAST is computed as the sum of the assistance trigger low threshold value MASTL looked up in step S112 and the correction value DPBAST computed in step S111. In step S116, it is determined whether the air intake passage pressure current value PBA is greater than or equal to the air intake passage pressure assistance trigger threshold value MAST obtained in step S114. In the case where the determination result is "YES", the flow proceeds to step S134. In the case where the determination result is "NO", the flow proceeds to step S119. Furthermore, in step S115 the air intake passage pressure assistance trigger threshold value MAST is computed as the sum of the air intake passage pressure assistance trigger high threshold value MASTE looked up in step S112 and the correction value DPBAST computed in step S111, and the flow proceeds to step S116.

Figure 8:
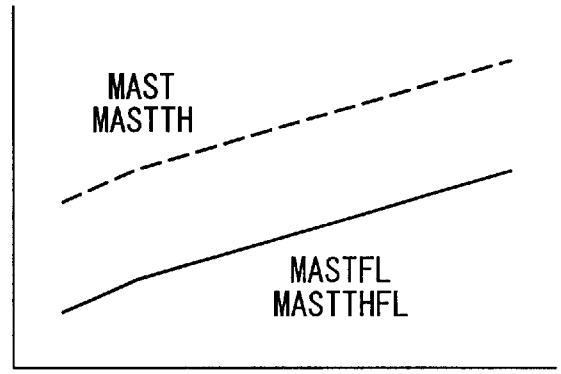
FIG. 8 is a graph for obtaining numeric values in step S119 and step S131.
Figure 9:
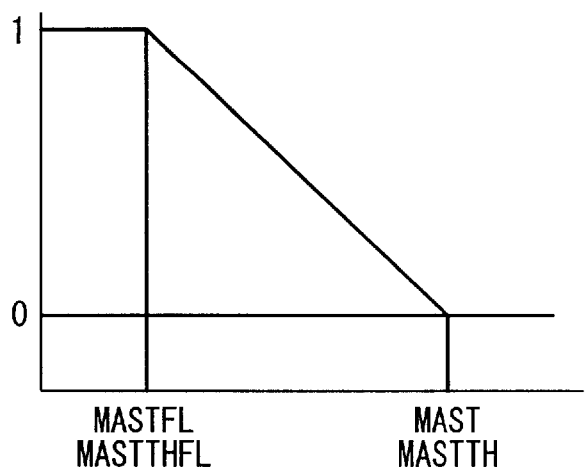
FIG. 9 is a graph for computation in step S120 and step S132.

Next, in step S119, as shown in FIG. 8, the final air intake passage pressure assistance trigger lower limit threshold value MASTFL is obtained by subtracting a predetermined lair intake passage pressure delta value #DCRSPB (for example 100 mmHg) from the abovementioned air intake passage pressure assistance trigger threshold value MAST. Next, in step S120 the final air intake passage pressure assistance trigger lower limit thresholds value MASTFL and the air intake passage pressure assistance trigger threshold value MAST are interpolated from the air intake passage pressure current value PBA as shown in FIG. 9 to obtain the cruise generation amount subtraction coefficient table value KPBRGN. In step S121 the cruise generation amount subtraction coefficient table value KPBRGN is assigned to the cruise generation amount subtraction coefficient KTR-GRGN. Then, in step S122, a "0" is assigned to the motor assistance determination flag F_MAST, and control returns.

In the abovementioned step S110, in the case where the determination result of the MT/CVT determination flag F_AT is "YES", that is, it is determined to be a CVT vehicle, the flow proceeds to step S123, and the computation processing of the air intake passage pressure assistance trigger correction value DPBASTTH is performed. The details of the processing are described later.

Figure 10:
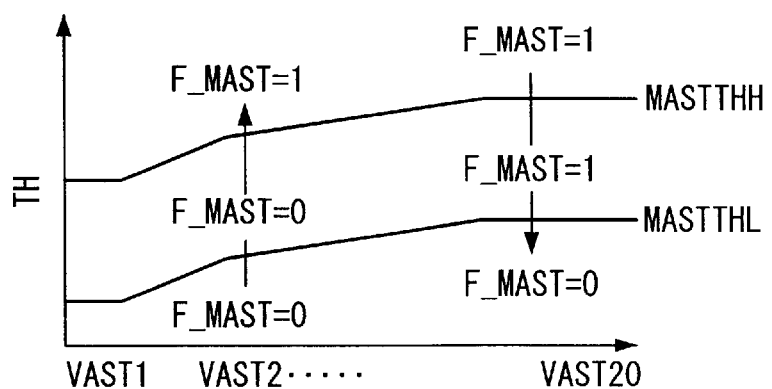
FIG. 10 is a graph for threshold value of a CVT vehicle in PB assistance mode.

Next in step S124 the air intake passage pressure assistance trigger threshold value MASTTHL/H is looked up from the air intake passage pressure assistance trigger table. In this air intake passage pressure assistance trigger table, as shown by two solid lines in FIG. 10, the high air intake passage pressure assistance trigger threshold value MASTTHH and the low air intake passage pressure assistance trigger threshold value MASTTHL for determining whether the motor assistance is applied with respect to the engine control vehicle speed VP are fixed. The arrangement is such that in the looking-up process of step S124, depending on the increase of the degree of throttle opening TH, or depending on the decrease of the engine control vehicle speed VP, when the high threshold value line MASTTHH is passed from below to above, the motor assistance determination flag F_MAST is changed from "0" to "1". Conversely, depending on the decrease of the degree of throttle opening TH, or depending on the increase of the engine control vehicle speed VP, when the low threshold value line MASTTHL is passed from above to below, the motor assistance determination flag F_MAST is changed from "1" to "0". Here, FIG. 10 performs switching at each stoichiometric/lean burn.

Then, in the next step S125 it is determined whether the flag setting of the motor assistance determination flag F_MAST is "1". In the case where the determination result is "1", the flow proceeds to step S126. In the case where the determination result is not "1", the flow proceeds to step S127. Then in step S126 the air intake passage pressure assistance trigger threshold value MASTTH is computed as the sum of the air intake passage pressure assistance trigger low threshold value MASTTHL looked up in step S124 and the correction value DPBASTTH computed in step S123. In step S128, it is determined whether the degree of throttle opening current value THEM is greater than or equal to the air intake passage pressure assistance trigger threshold value MASTTH obtained in step S126. In the case where the determination result is "YES", the flow proceeds to step S134. In the case where the determination result is "NO ", the flow proceeds to step S131.

Furthermore, in step S127 the air intake passage pressure assistance trigger threshold value MASTTH is computed as the sum of the air intake passage pressure assistance trigger high threshold value MASTTHH looked up in step S124 and the correction value DPBASTTH computed in step S123, and the flow proceeds to step S128.

Next, in step S131, as shown in FIG. 8, the final air intake passage pressure assistance trigger lower limit threshold value MASTTHFL is obtained by subtracting a predetermined degree of throttle opening delta value #DCRSTHV from the abovementioned air intake passage pressure assistance trigger threshold value MASTTH. Next, in step, S132 the final air intake passage pressure assistance trigger lower limit threshold value MASTTHFL and the air intake passage pressure assistance trigger threshold value MASTTH are interpolated from the degree of throttle opening current value THEM as shown in FIG. 9 to obtain the cruise generation amount subtraction coefficient table value KPBRGTH. In step S133 the cruise generation amount subtraction coefficient table value KPBRGTH is assigned to the cruise generation amount subtraction coefficient KTRGRGN. Then, in step S122, a "0" is assigned to the motor assistance determination flag F_MAST, and control returns.

[TH Assistance Trigger Correction]

Figure 11:
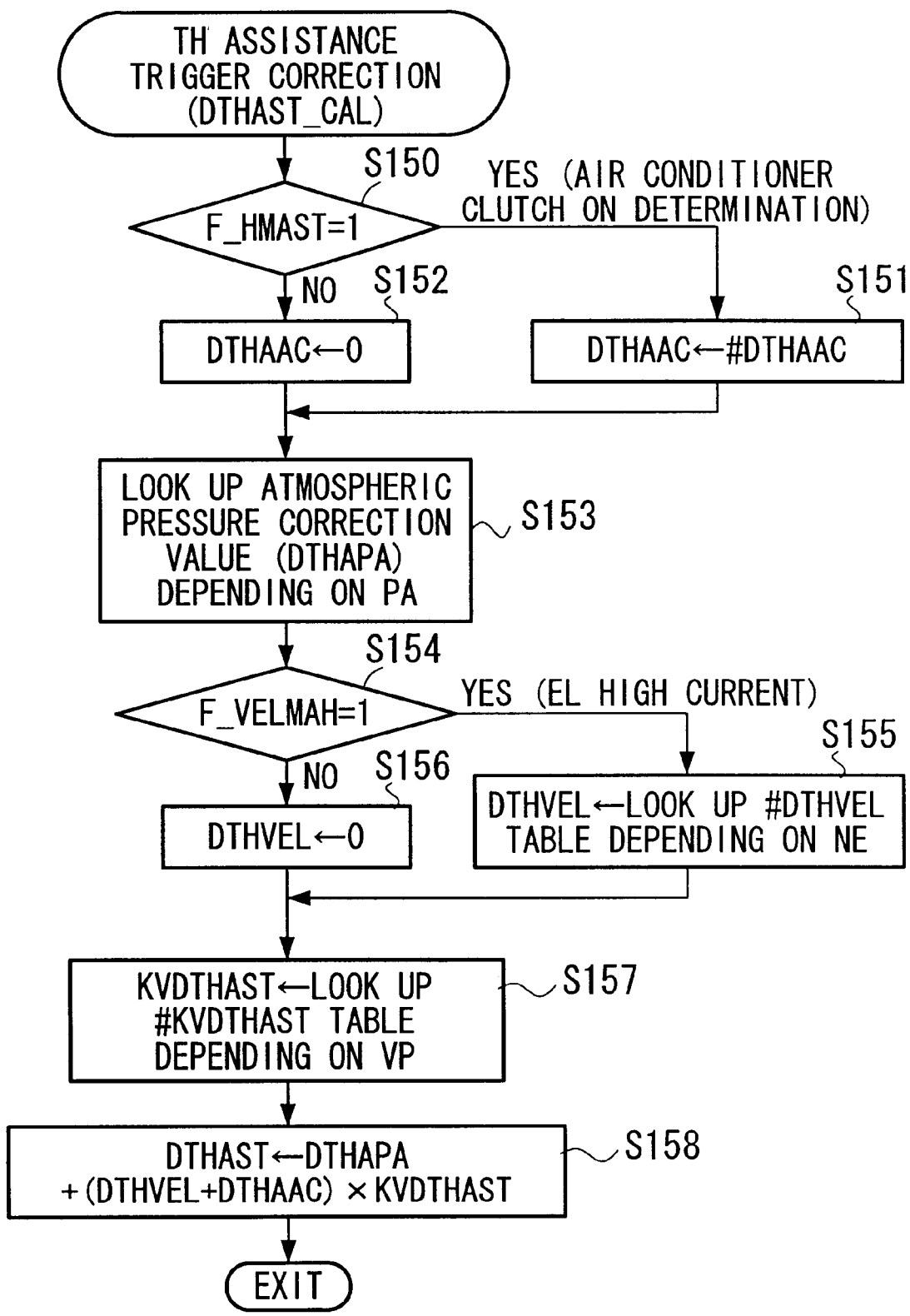
FIG. 11 is a flow chart of TH assistance trigger correction.

FIG. 11 shows a flow chart for the throttle assistance trigger correction in the aforementioned step S103.

In step S150, it is determined whether an air conditioner clutch ON flag F_HMAST is "1". In the case where the determination result is "YES", that is, the air conditioner clutch is on, in step S151 a predetermined value #DTHAAC (e.g. 20 degrees) is assigned to the air conditioner correction value DTHAAC, and the flow proceeds to step S153.

Figure 12:
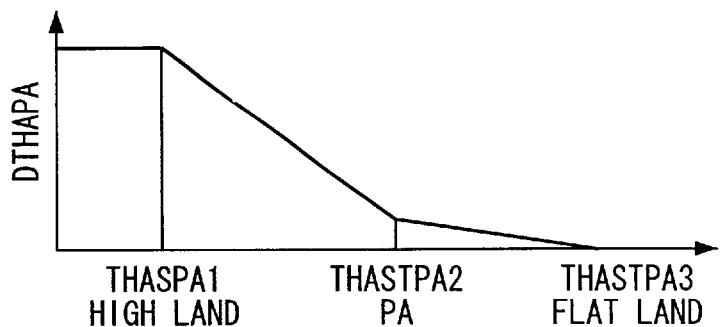
FIG. 12 is a graph of an atmospheric pressure correction table.

In the case where the determination result of step S150 is "NO", that is, the air conditioner clutch is off, a "0" is assigned to the air conditioner correction value DTHAAC, and the flow proceeds to step S153. In this manner, the motor assistance threshold value is raised. In step S153 an atmospheric pressure correction value (DTHAPA), depending on atmospheric pressure (PA), is looked up. This looking-up is for looking up a correction value, which is set to reduce as the vehicle moves from high land to low land, from the throttle assistance trigger PA correction table as shown in FIG. 12. The atmospheric pressure correction value DTHAPA is obtained by this table looking-up.

Figure 13:
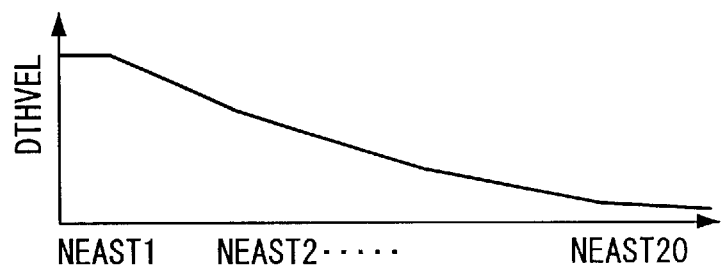
FIG. 13 is a graph showing a 12V system current consumption correction table.

Next, in step S154 it is determined whether a high current flag F_VELMAH is "1". The setting of this high current flag will be described later. When the 12V current consumption is high, by raising the assistance trigger threshold value, the frequency of acceleration mode is decreased to increase the frequency of cruise mode so that decrease of the battery remaining charge can be prevented. As a result of the determination in step S154, if there is high current, in step S155, as shown in FIG. 13, the high current correction value DTHVEL depending on the engine speed NE is obtained by table looking-up, and the flow proceeds to step S157. As a result of the determination in step S154, if it is determined that there is no high current, a "0" is set to the high current correction value DTHVEL in step S156, and the flow proceeds to step S157.

Figure 14:
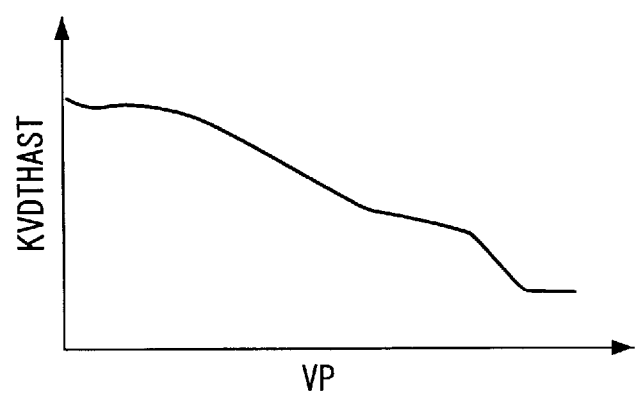
FIG. 14 is a graph showing the relationship between control vehicle speed and vehicle speed correction coefficient.

Next, in step S157, the throttle assistance trigger load correction amount vehicle speed correction coefficient KVDTHAST depending on the control vehicle speed VP is obtained by table looking-up as shown in FIG. 14. Here, as the control vehicle speed VP increases, the throttle assistance trigger load correction amount vehicle speed correction coefficient KVDTHAST decreases. In this manner, the lower the vehicle speed gets, the higher the assistance trigger threshold is increased.

Then, in the next step S158 the throttle assistance trigger correction value DTHAST is obtained from the air conditioner correction value DTHAAC obtained in step S151 or step S152, the atmospheric pressure correction value DTHAPA obtained in step S153, the high current correction value DTHVEL obtained in step S155 or step S156 and the throttle assistance trigger load correction amount vehicle speed correction coefficient KVDTHAST obtained in step S157, and control terminates.

[PB Assistance Trigger Correction (MT)]

Figure 15:
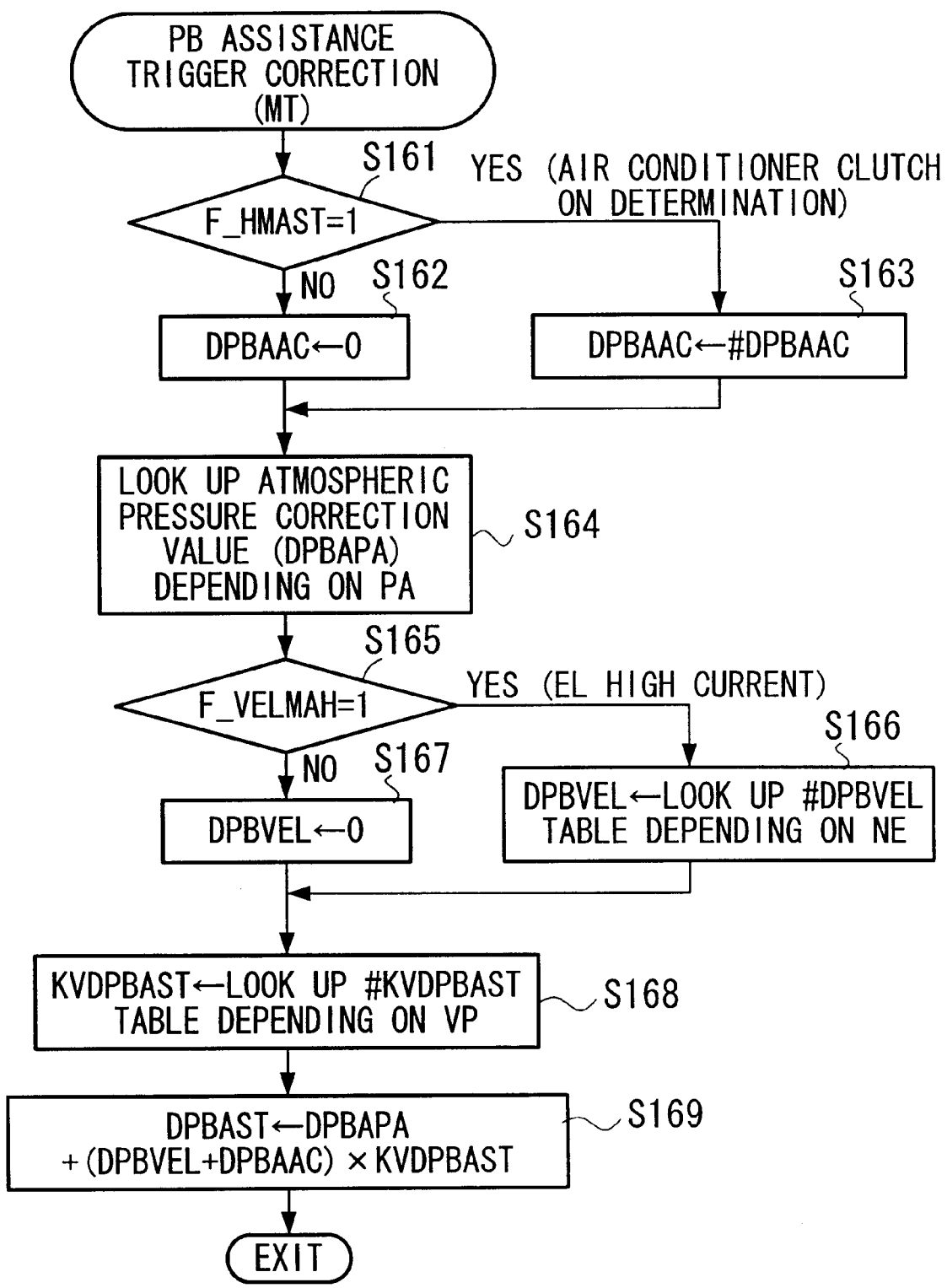
FIG. 15 is a flow chart of PB assistance trigger correction (MT vehicle).

FIG. 15 is a flow chart showing the air intake passage pressure throttle assistance trigger correction in the aforementioned step S111.

In step S161, it is determined whether the air conditioner clutch ON flag F_HMAST is "1". In the case where the determination result is "YES", that is, the air conditioner clutch is on, a predetermined value #DPBAAC is assigned to the air conditioner correction value DPBAAC in step S163, and the flow proceeds to step S164. In the case where the determination result of step S161 is "NO", that is, the air conditioner clutch is off, a "0" is assigned to the air conditioner correction value DPBAAC, and the flow proceeds to step S164. In this manner, the motor assistance threshold value is raised.

Figure 16:
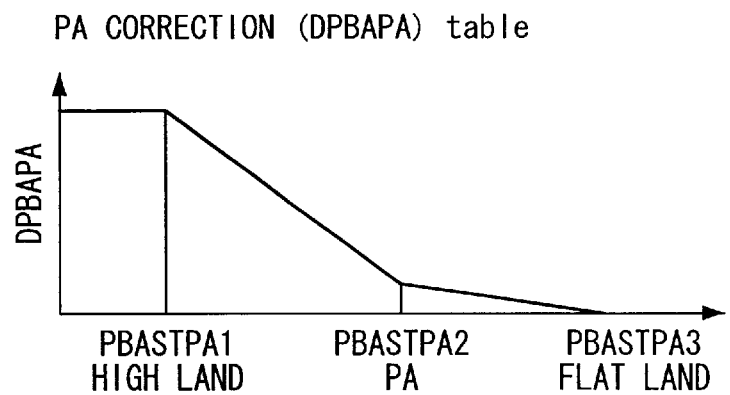
FIG. 16 is a graph of an atmospheric pressure correction table.

In step S164, the atmospheric pressure correction value (DPBAPA), depending on the atmospheric pressure is looked up. This looking-up is for looking up a correction value, which is set to reduce as the vehicle moves from high land to low land, from the air intake passage pressure assistance trigger PA correction table as shown in FIG. 16. The atmospheric pressure correction value DPBAPA is obtained by this table looking-up.

Figure 17:
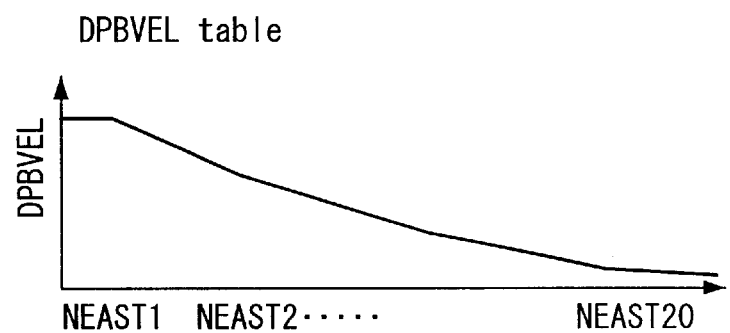
FIG. 17 is a graph showing a 12V system current consumption correction table.

Next, in step S165 it is determined whether the high current flag F_VELMAH is "1". The setting of this high current flag will be described later. In the same manner as the description in the aforementioned step S154, this step is because the assistance trigger threshold value needs to be raised when the 12V current consumption is high. As a result of the determination in step S165, if there is high current, in step S166 as shown in FIG. 17, the high current correction value DPBVEL depending on the engine speed NE is obtained by table looking-up, and the flow proceeds to step S168. As a result of the determination in step S165, if there is no high current, a "0" is set to the high current correction value DPBVEL in step S167, and the flow proceeds to step S168.

Figure 18:
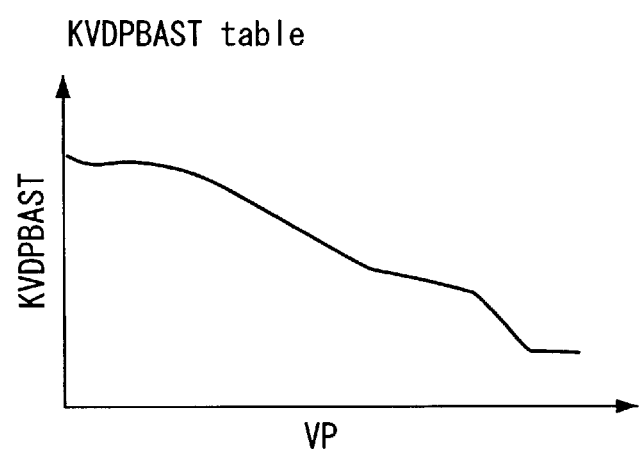
FIG. 18 is a graph showing the relationship between control vehicle speed and vehicle speed correction coefficient.
Figure 19:
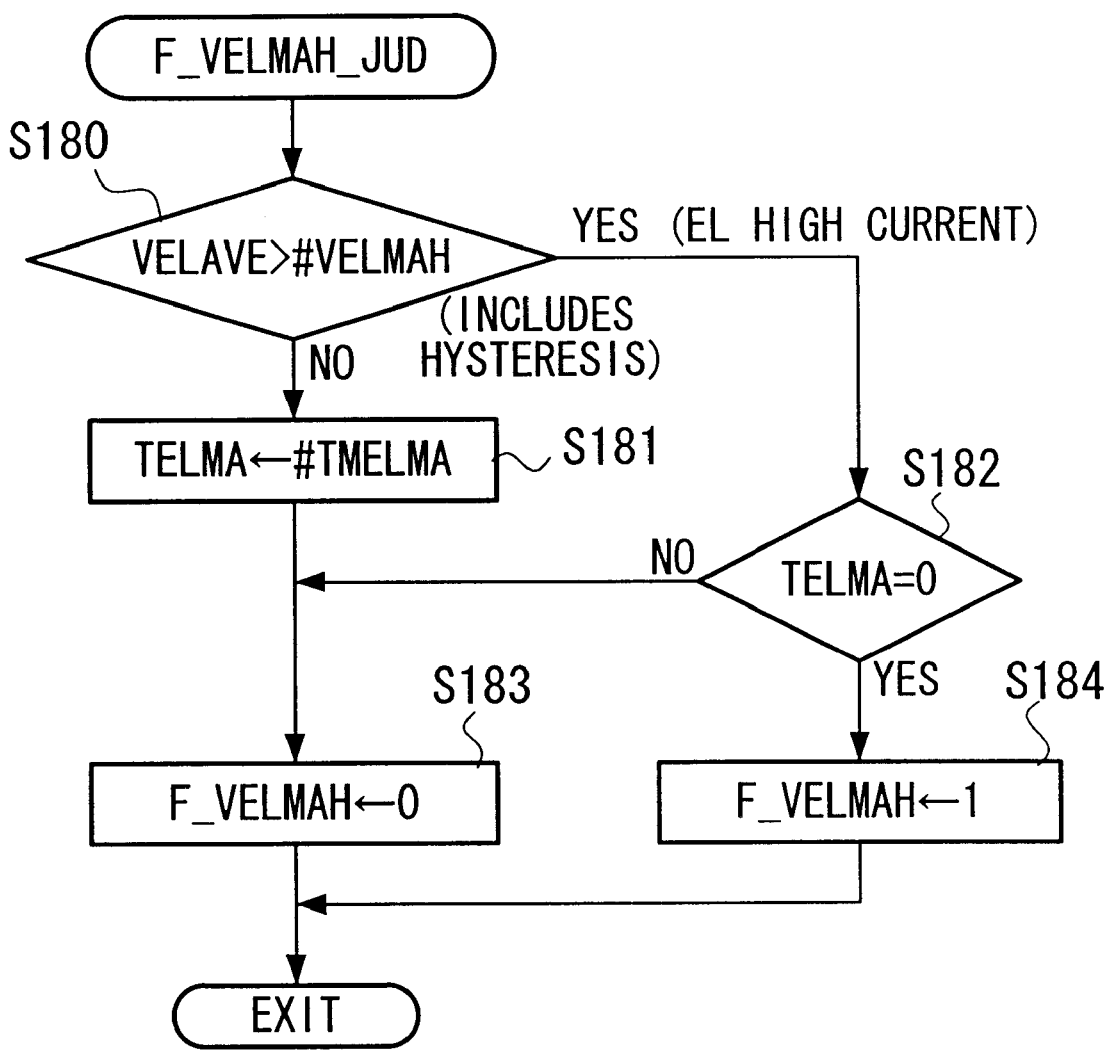
FIG. 19 is a flow chart for setting a high current determination flag.

Next, in step S168 the air intake passage pressure assistance trigger load correction amount vehicle speed correction coefficient KVDPBAST depending on the control vehicle speed VP is obtained by table looking-up as shown in FIG. 18. Here, for the same reason as in the aforementioned description for step S157, as the control vehicle speed VP increases, the air intake passage pressure assistance trigger load correction amount vehicle speed correction coefficient KVDPBAST decreases.

Then, in the next step S169 the air intake passage pressure assistance trigger correction value DPBAST is obtained from the air conditioner correction value DPBAAC obtained in step S162 or step S163, the atmospheric pressure correction value DPBAPA obtained in step S164, the high current correction value DPBVEL obtained in step S166 or step S167 and the air intake passage pressure assistance trigger load correction amount vehicle speed correction coefficient KVDPBAST obtained in step S168, and control terminates.

Here is a description of a flow chart in FIG. 9 for setting the high current flag. In step S180, it is determined whether an average current consumption VELAVE is greater than a predetermined value #VELMAH (for example, 20A). In the case where the determination result is "YES", that is, it is determined that there is high current, in step S182 it is determined whether a delay timer TELMA is "0". In the case of "0", in step S184, a "1" is set to the high current flag F_VELMAH, and control terminates. As a result of the determination in step S182, if it is determined that the delay timer TELMA is not "0", the flow proceeds to step S183. In the case where the determination result of step S180 is "NO", that is, it is determined that there is no high current, in step S181 a predetermined value #TMELMA (for example, 30 seconds) is set to the delay timer TELMA, and the flow proceeds to step S183. In step S183, a "0" is set to the high current flag F_VELMAH, and control terminates. This high current flag F_VELMAH is determined in the aforementioned step S154 and step S165, and in step S194 to be mentioned later.

Here, the condition of the 12V system current consumption being determined high is restricted to those cases where this is continued for a certain duration by the delay timer TELMA. Therefore, the case where the current consumption increases temporarily, for example, when raising or lowering an automatic window, lighting a stop lamp and the like is avoided.

[PB Assistance Trigger Correction (CVT)]

Figure 20:
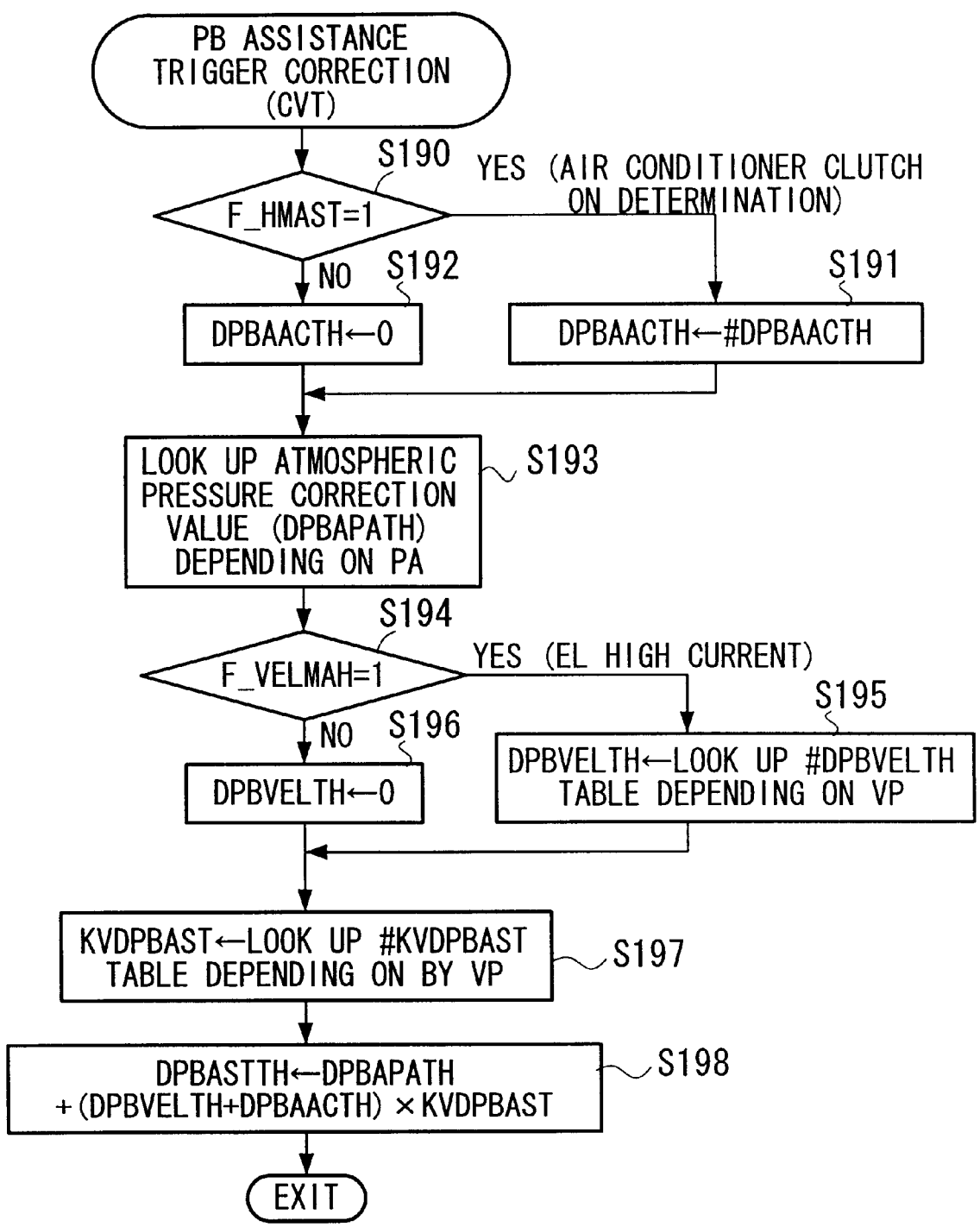
FIG. 20 is a flow chart of PB assistance trigger correction (CVT vehicle).

FIG. 20 is a flow chart showing the air intake passage pressure throttle assistance trigger correction in the aforementioned step S123.

In step S190 it is determined whether the air conditioner clutch ON flag F_HMAST is "1". In the case where the determination result is "YES", that is, the air conditioner clutch is on, in step S191 a predetermined value #DPBAACTH is assigned to the air conditioner correction value DPBAACTH, and the flow proceeds to step S193.

In the case where the determination result of step S190 is "NO", that is, the air conditioner clutch is off, a "0" is assigned to the air conditioner correction value DPBAACTH in step S192, and the flow proceeds to step S193. In this manner, the motor assistance threshold value is raised.

Figure 21:
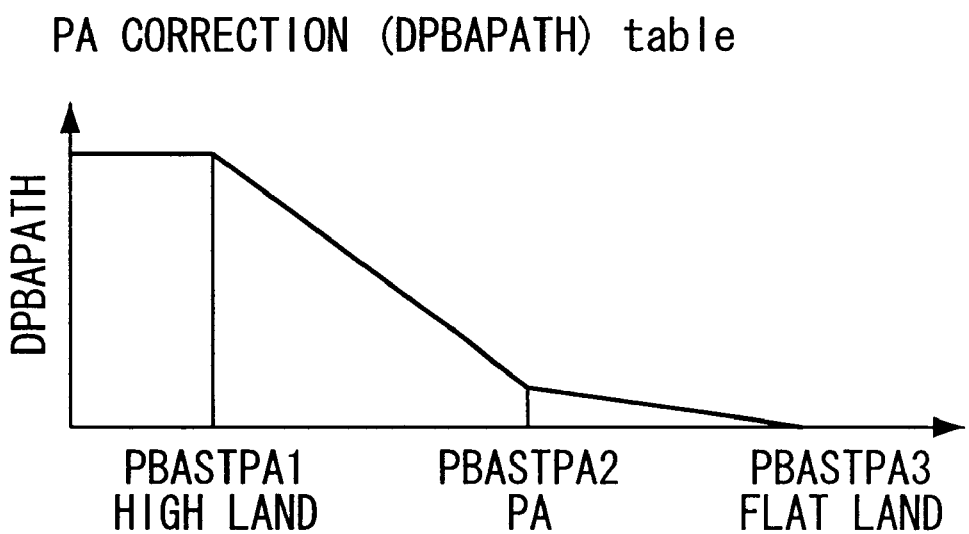
FIG. 21 is a graph of an atmospheric pressure correction table.

In step S193, atmospheric pressure correction value (DPBAPATH), depending on atmospheric pressure is looked up. This looking-up is for looking up a correction value, which is set to, reduce as the vehicle moves from high land to low land, from the air intake passage pressure assistance trigger PA correction table as shown in FIG. 21. The atmospheric pressure correction value DPBAPATH is obtained by this table looking-up.

Figure 22:
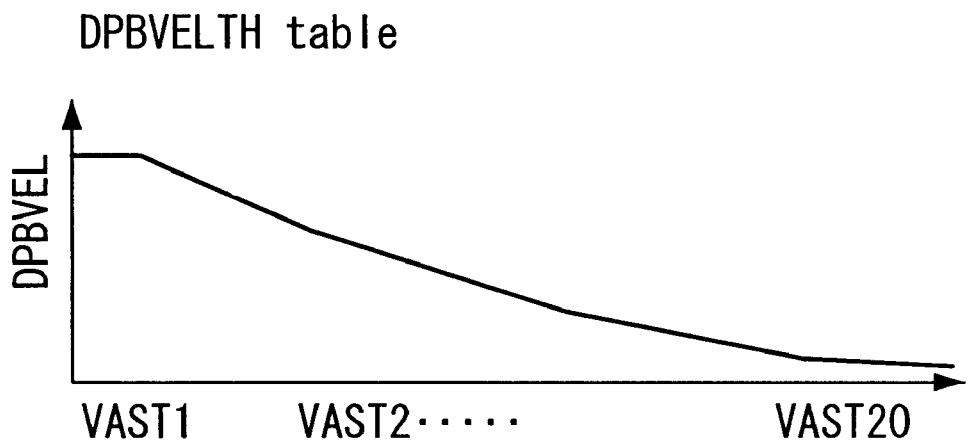
FIG. 22 is a graph showing a 12V system current consumption correction table.

Next, in step S194 it is determined whether the high current flag F_VELMAH is "1". This is because when the 12V current consumption is high, the assistance trigger threshold value needs to be raised for the same reason as described above. As a result of the determination in step S194, if there is high current, in step S195, as shown in FIG. 22, high current correction value DPBVELTH depending on the control vehicle speed VP is obtained by table looking-up, and the flow proceeds to step S197. As a result of the determination in step S194, if there is no high current, a "0" is set to the high current correction value DPBVELTH in step S196, and the flow proceeds to step S197.

Next, in step S197 the air intake passage pressure assistance trigger load correction amount vehicle speed correction coefficient KVDPBAST depending on the control vehicle speed VP is obtained by table looking-up as shown in FIG. 18. Here, in the same manner as described before, as the control vehicle speed VP increases, the air intake passage pressure assistance trigger load correction amount vehicle speed correction coefficient KVDPBAST decreases.

Then, in the next step S198 an air intake passage pressure assistance trigger correction value DPBASTTH is obtained from the air conditioner correction value DPBAACTH obtained in step S191 or step S192, the atmospheric pressure correction value DPBAPATR obtained in step S193, the high current correction value DPBVELTH obtained in step S195, or step S196 and the air intake passage pressure assistance trigger load correction amount vehicle speed correction coefficient KVDPBAST obtained in step S197, and control terminates.

[Cruise Mode]

Next is a description of cruise mode based on FIG. 23 through FIG. 28.

Figure 23:
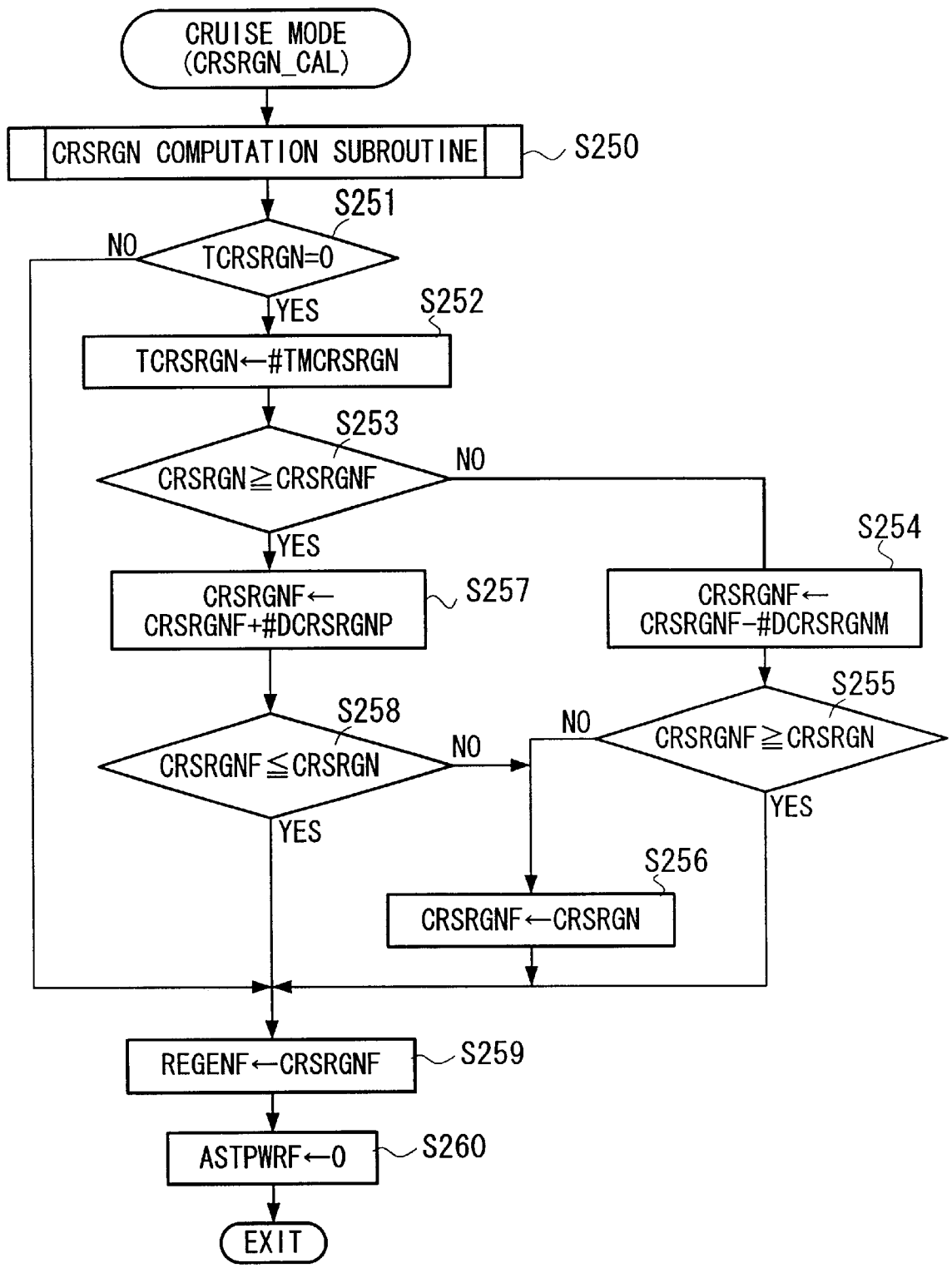
FIG. 23 is a flow chart of cruise mode.

First is a description of a flow chart in FIG. 23.

Figure 24:
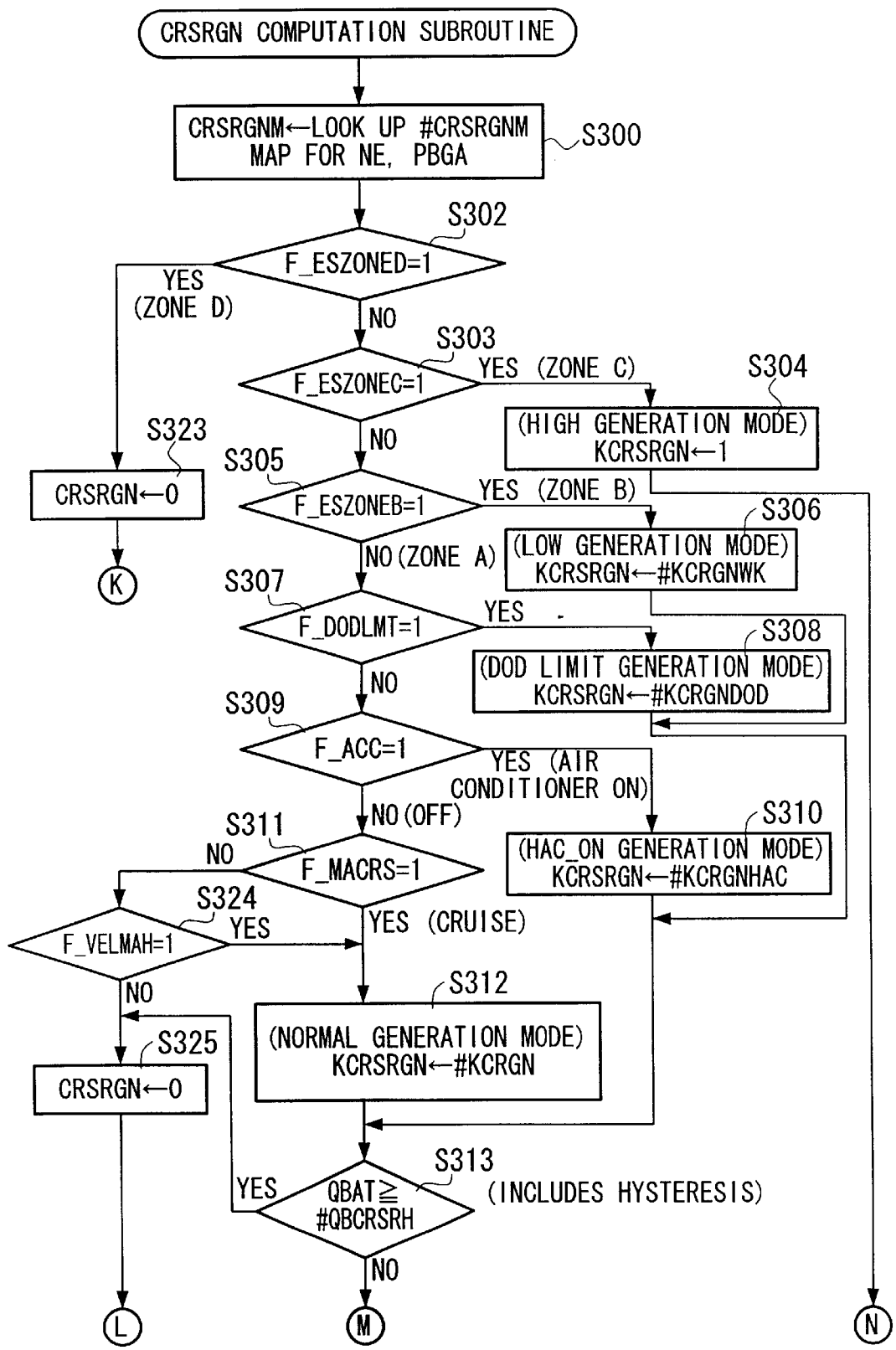
FIG. 24 is a flow chart for computing cruise generation amount.
Figure 25:
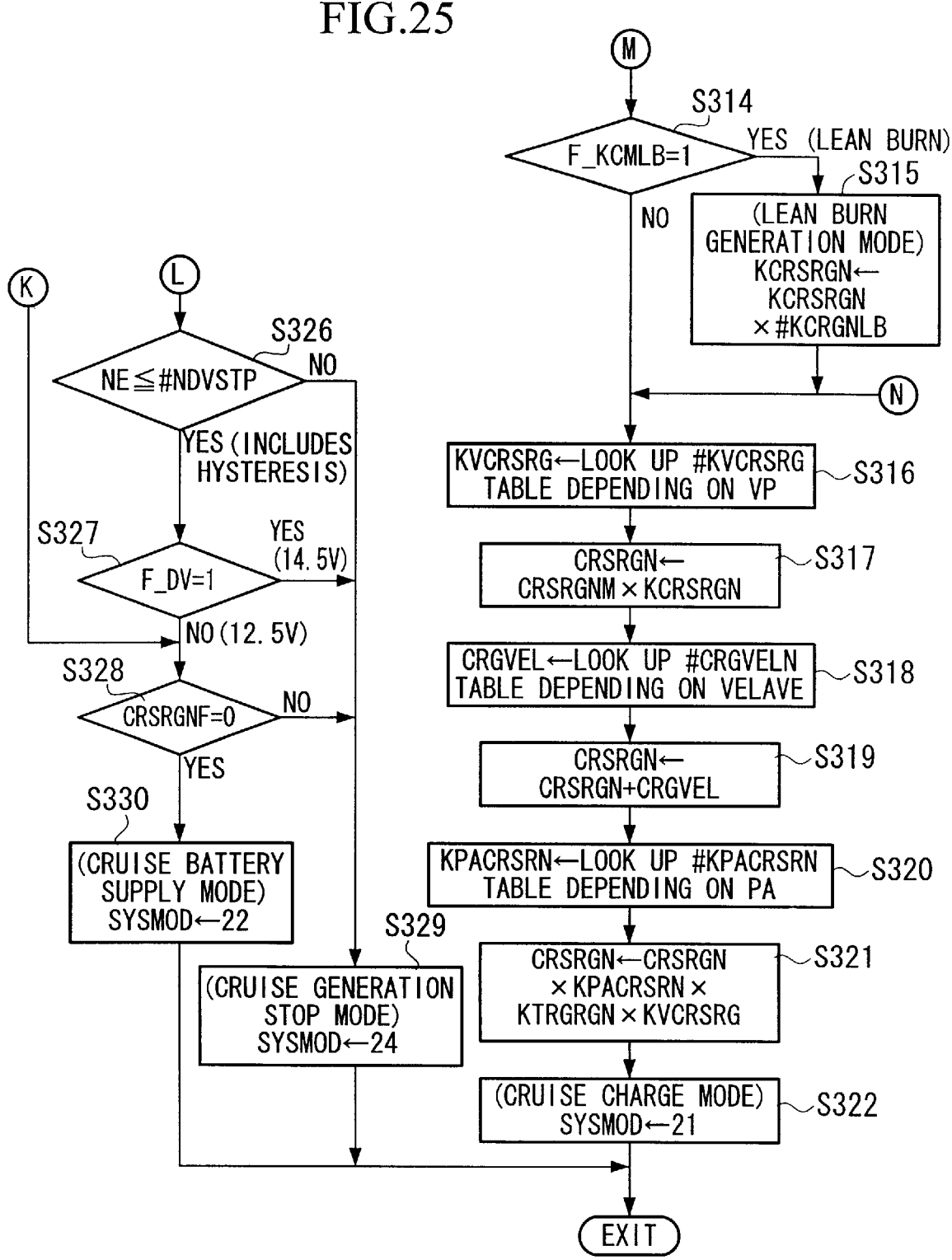
FIG. 25 is a flow chart for computing cruise generation amount.

In step S250 in FIG. 23, the cruise generation amount computation processing of FIG. 24 and FIG. 25 is performed as described later. Then, the flow proceeds to step S251, and it is determined whether a gradual addition/subtraction timer TCRSRGN is "0". In the case where the determination result is "NO", in step S259 a final cruise generation amount CRSRGNF is set to a final charge instruction value REGENF, a "0" is set to a final assistance instruction value ASTWRF in step S260, and control terminates.

In the case where the determination result of step S251 is "YES", in step S252 a predetermined value #TMCRSRGN is set to the gradual addition/subtraction timer TCRSRGN, and the flow proceeds to step S253. In step S253 it is determined whether the cruise generation amount CRSRGN is greater than or equal to the final cruise generation amount CRSRGNF.

In the case where the determination result of step S253 is "YES", in step S257 a gradual addition amount #DCRSRGNP is added to the final cruise generation amount CRSRGNF, and in step S258 it is again determined whether cruise generation amount CRSRGN is greater than or equal to the final cruise generation amount CRSRGNF. In the case where the determination result of step S258 is that the cruise generation amount CRSRGN is greater than or equal to the final cruise generation amount CRSRGNF, the flow proceeds to step S259.

In the case where the determination result of step S258 is that the cruise generation amount CRSRGN is less than the final cruise generation amount CRSRGNF, the flow proceeds to'step S256. Here the cruise generation amount CRSRGN is assigned to the final cruise generation amount CRSRGNF, and the flow proceeds to step S259.

In the case where the determination result of step S253 is "NO", in step S254 a gradual subtraction amount #DCRSRGNM is subtracted from the final cruise generation amount CRSRGNF, and in step S255 it is determined whether the final cruise generation amount CRSRGNF is greater than or equal to the cruise generation amount CRSRGN. In the case where the determination result of step S255 is that the cruise generation amount CRSRGN is greater than the final cruise generation amount CRSRGNF, the flow proceeds to step S256. In the case where the determination result of step S255 is that the final cruise generation amount CRSRGNF is greater than or equal to the cruise generation amount CRSRGN, the flow proceeds to step S259.

Accordingly, with the processing of step S251 and thereafter, it is possible to shift smoothly to cruise generation mode without a sudden change of generation amount.

Next is a description of a flow chart for cruise generation amount computation in step S250 in FIG. 23, according to FIG. 24 and FIG. 25.

In step S300, a cruise generation amount CRSRGNM is looked up in a map. This map shows generation amount fixed depending on the engine speed NE and the air intake passage pressure PBGA, and performs switching between CVT and MT.

Next, in step S302 it is determined whether the energy storage zone D determination,flag F_ESZONED is "1". In the case where the determination result is "YES", that is, it is determined that the battery remaining charge SOC is in zone D, the flow proceeds to step S323, a "0" is set to the cruise generation amount CRSRGN, and the flow proceeds to step S328. In step S328 it is determined whether the final cruise generation instruction value CRSRGNF is "0". In the case where the determination result of step S328 is that the instruction value is not "0", the flow proceeds to step S329, shifts to cruise generation stop mode, and terminates. In the case where the determination result of step S328 is that the instruction value is "0", the flow proceeds to step S330, shifts to cruise battery supply mode, and terminates.

In the case where the determination result of step S302 is "NO", that is, it is determined that the battery remaining charge SOC is outside zone D, the flow proceeds to step S303, and it is determined whether the energy storage zone C determination flag F_ESZONEC is "1". In the case where the determination result is "YES", that is, it is determined that the battery remaining charge SOC is in zone C, the flow proceeds to step S304. Here, a "1" (for high generation mode) is assigned to the cruise generation amount correction coefficient KCRSRGN, and the flow proceeds to step S316. In the case where the determination result of step S303 is "NO", that is, it is determined that the battery remaining charge SOC is outside zone C, the flow proceeds to step S305.

In step S305, it is determined whether the energy storage zone B determination flag F_ESZONEB is "1". In the case where the determination result is "YES", that is, it is determined that the battery remaining charge SOC is in zone B, the flow proceeds to step S306. In step S306, the cruise generation amount coefficient #KCRGNWK (for low generation mode) is assigned to the cruise generation amount correction coefficient KCRSRGN, and the flow proceeds to step S313.

In the case where the determination result of step S305 is "NO", that is, it is determined that the battery remaining charge SOC is out of zone B, the flow proceeds to step S307, and here it is determined whether the flag setting of DOD limit determination flag F_DODLMT is "1". In the case where the determination result of step S307 is "YES", the flow proceeds to step S308, and the cruise generation amount coefficient #KCRGNDOD (for DOD limit generation mode) is assigned to the cruise generation amount correction coefficient KCRSRGN, and the flow proceeds to step S313.

In this manner, the generation amount is set to be higher than usual, which enables rapid recovery of the battery remaining charge SOC.

On the other hand, in the case where the determination result of step S307 is "NO", the flow proceeds to step S309, and it is determined whether the flag setting of an air conditioner ON flag F_ACC is "1". In the case where the determination result is "YES", that is, it is determined that the air conditioner is on, the flow proceeds to step S310, the cruise generation amount coefficient #KCRGNHAC (for HAC ON generation mode) is assigned to the cruise generation amount correction coefficient KCRSRGN, and the flow proceeds to step S313.

In the case where the determination result of step S309 is "NO", that is, it is determined that the air conditioner is "off", the flow proceeds to step S311, and it is determined whether the flag setting of a cruise mode determination flag F_MACRS is "1". In the case where the determination result of step S311 is "NO", that is, it is determined that it is not cruise mode, the flow proceeds to step S324, and here it is determined whether the high current flag F_VELMAH is "1". In the case where the determination result of step S324 is that there is high current, the flow proceeds to step S312 similar to the case where the determination result of step S311 is "YES", that is, it is determined that it is cruise mode. Then the cruise mode generation amount coefficient #KCRGN (for normal generation mode) is assigned to the cruise generation amount correction coefficient KCRSRGN, and the flow proceeds to step S313. In this manner, in the case where the high current flag F_VELMAL is determined to be "1", since basically control does not proceed to a later described cruise battery supply mode in step S330 or a cruise generation stop mode in step S329, it is possible to prevent the occurrence of a situation where the battery remaining charge is reduced.

In the case where the determination result of step S324 is that there is no high current, the flow proceeds to step S325, a "0" is assigned to the cruise generation amount CRSRGN, and the flow proceeds to step S326. In step S326 it is determined whether the engine speed NE is less than or equal to a cruise battery supply mode execution upper limit engine speed #NDVSTP. In the case where the determination result is "YES", that is, it is determined that the engine speed NE≦the cruise battery supply mode execution upper limit engine speed #NDVSTP, the flow proceeds to step S327. In step S327 it is determined whether a downverter flag F_DV is "1". In the case where the determination result is "YES, control shifts to cruise generation stop mode in step S329. In the case where the determination result of step S327 is "NO", the flow proceeds to step S328.

In the case where the determination result of step S326 is "NO", that is, it is determined that the engine speed NE >the cruise battery supply mode execution upper limit engine speed #NDVSTP, the flow proceeds to step S329. The abovementioned cruise battery supply mode execution upper limit engine speed #NDVSTP is a value with hysteresis.

In step S313, it is determined whether the battery remaining charge QBAT (same meaning as SOC) is greater than or equal to the normal generation mode execution upper limit remaining charge #QBCRSRH. The abovementioned normal generation mode execution upper limit remaining charge #QBCRSRH is a value with hysteresis.

In the case where the determination result of step S313 is "YES", that is, the battery remaining charge QBAT≧the normal generation mode execution upper limit remaining charge #QBCRSRH, the flow proceeds to step S325.

In the case where it is determined that the battery remaining charge QBAT<the normal generation execution upper remaining charge #QBCRSRH, in step S314 it is determined whether the flag setting of the lean burn determination flag F_KCMLB is "1". In the case where the determination result is "YES", that is, it is determined to be lean burn, in step S315 the value where the cruise generation amount correction coefficient KCRSRGN is multiplied by the cruise generation amount coefficient #KCRGNLB (for lean burn generation mode) is assigned to the cruise generation amount correction coefficient KCRSRGN, and the flow proceeds to step S316. In the case where the determination result of step S314 is "NO", that is, it is determined that it is not lean burn mode, the flow proceeds to step S316.

Figure 26:
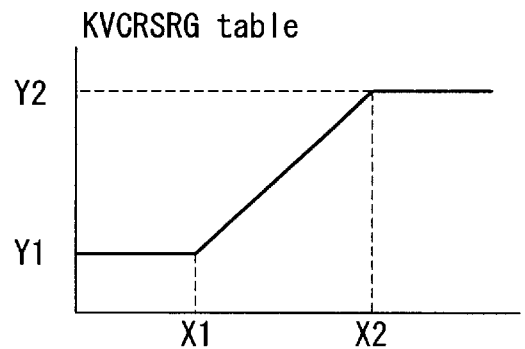
FIG. 26 is a graph for obtaining a cruise generation amount coefficient #KVCRSRG.
Figure 27:
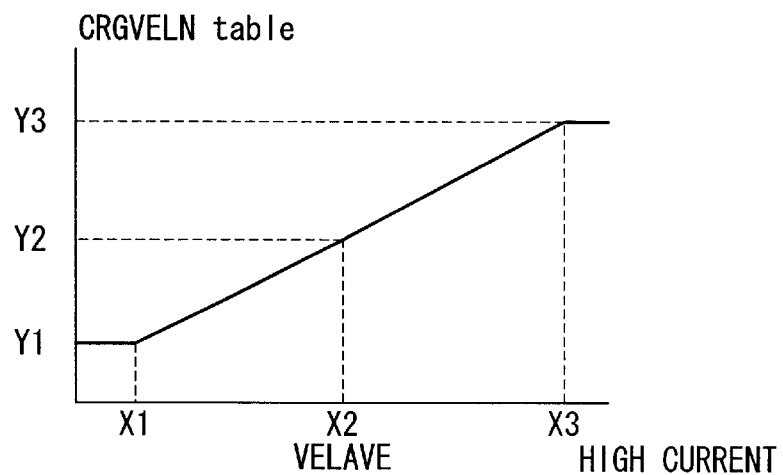
FIG. 27 is a graph for obtaining a cruise generation amount coefficient #CRGVELN

In step S316, the cruise generation amount subtraction coefficient KVCRSRG shown in FIG. 26 is obtained for the engine control vehicle speed VP by looking-up from a #KVCRSRG table. Next, in step S317, the value for where map value CRSRGNM of the cruise generation amount is multiplied by the cruise generation amount correction coefficient KCRSRGN is assigned to the cruise generation amount CRSRGN. Then, in step S318 the correction amount CRGVEL shown in FIG. 27 is obtained for average current consumption VELAVE by looking-up from a #CRGVELN table, and the flow proceeds to step S319. In step S319 a correction addition amount CRGVEL is added to the cruise generation amount CRSRGN, and the flow proceeds to step S320. Consequently, in step S319 a cruise generation amount depending on the 12V system consumption current is added to handle this. In this manner, the remaining charge of the battery 3 is increased at the time of cruising to prevent the reduction of the battery remaining charge due to being directed to the 12V system.

Figure 28:
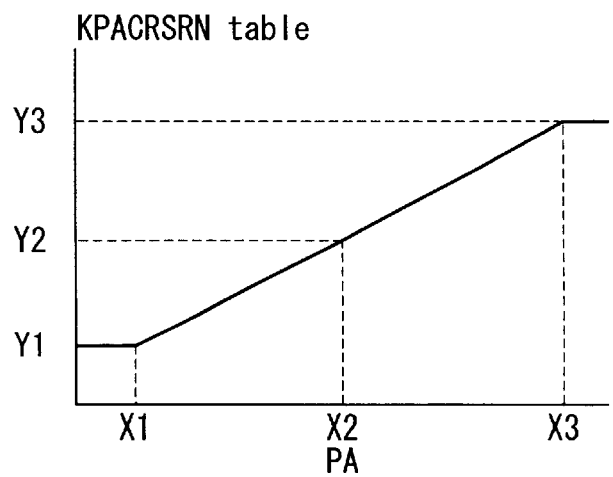
FIG. 28 is a graph for obtaining a cruise generation amount coefficient #KPACRSRN.

In step S320 cruise generation amount PA correction coefficient KPACRSRN shown in FIG. 28 is obtained for the control atmospheric pressure PA by looking-up from a #KPACRSRN table, and the flow proceeds to step S321.

Then, in step S321 the cruise generation amount CRSRGN is multiplied by the cruise generation amount PA correction coefficient KPACRSRN obtained in step S320, the cruise generation amount subtraction coefficient KTRGRGN (set in step S121, assistance trigger determination), and the cruise generation amount KVCRSRG obtained in step S316, to obtain a final cruise generation amount CRSRGN, and in step S322 control shifts to cruise charge mode.

[Deceleration Mode]

Next is a description of a deceleration mode based on FIG. 29 through FIG. 34.

Figure 29:
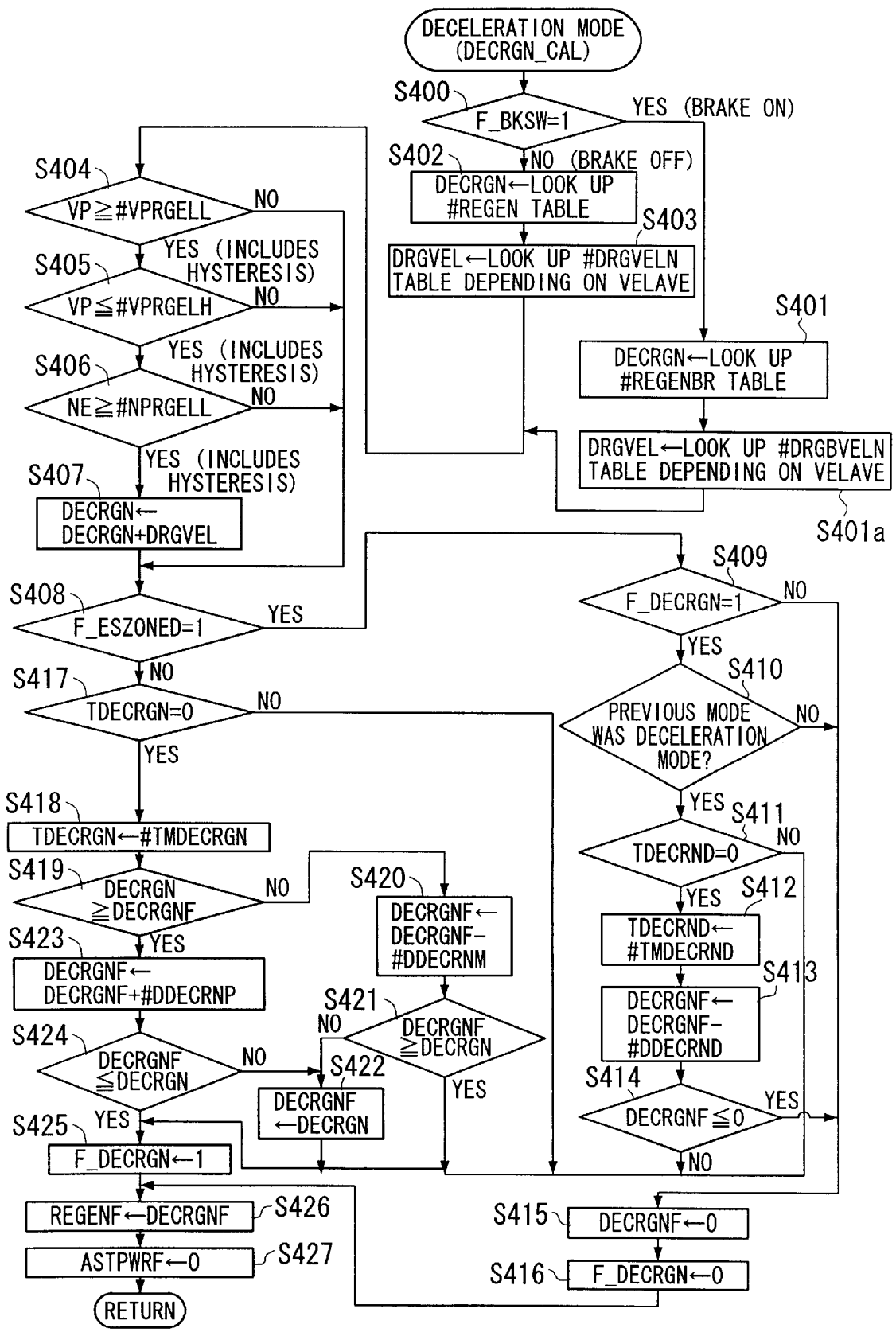
FIG. 29 is a flow chart of deceleration mode.

First, the flow chart of FIG. 29 is described.

Figure 35:
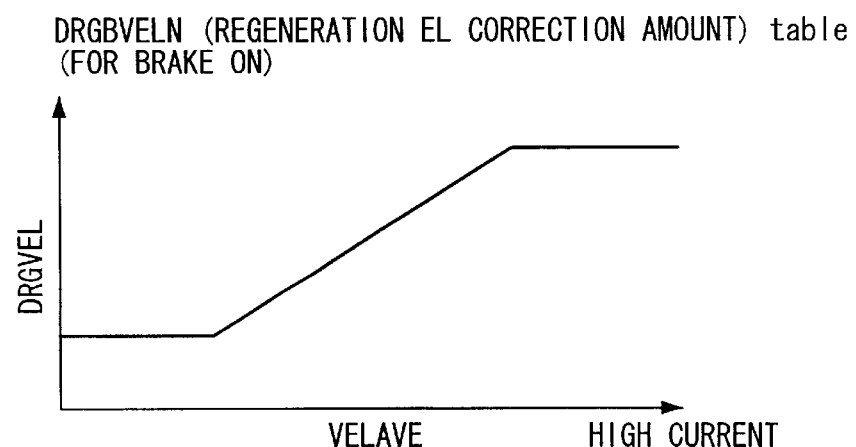

In step S400 in FIG. 29, it is determined whether a brake switch flag F_BKSW is "1". In the case where the determination result of step S400 is "YES", that is, the brake is on, in step S401 a deceleration regeneration computed value DECRGN is looked up from a #REGENBR table in FIG. 32 (for MT) or FIG. 33 (for CVT), and the flow proceeds to step S401a. In step S401a, deceleration regeneration correction amount DRGVEL is looked up for the average consumption current VELAVE in a #DRGBVELN table as shown in FIG. 35, and the flow proceeds to step S404.

Figure 30:
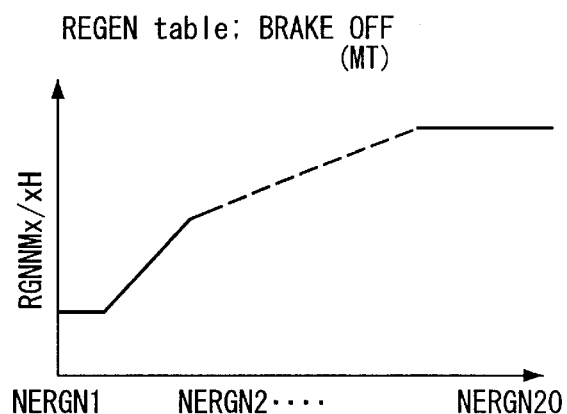
FIG. 30 is a graph for obtaining deceleration regeneration correction amount when a brake of an MT vehicle is off.
Figure 31:
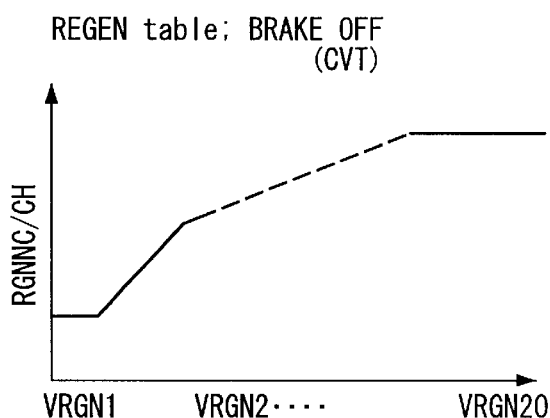
FIG. 31 is a graph for obtaining deceleration regeneration correction amount when a brake of a CVT vehicle is off.
Figure 32:
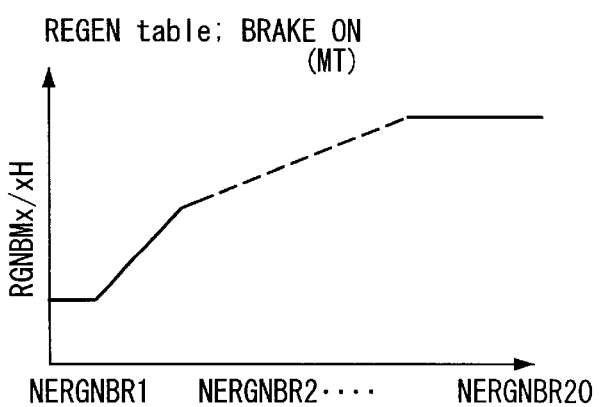
Figure 33:
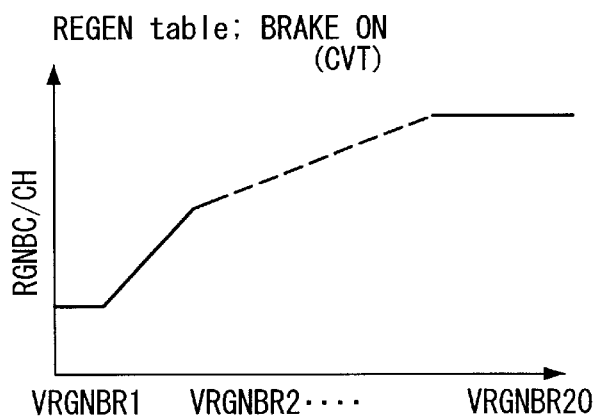

In the case where the determination result of step S400 is "NO", that is, the brake is off, the flow proceeds to step S402, a deceleration regeneration computed value DECRGN is looked up from a #REGEN table in FIG. 30 (for MT) or FIG. 31 (for CVT), and the flow proceeds to step S403.

Figure 34:
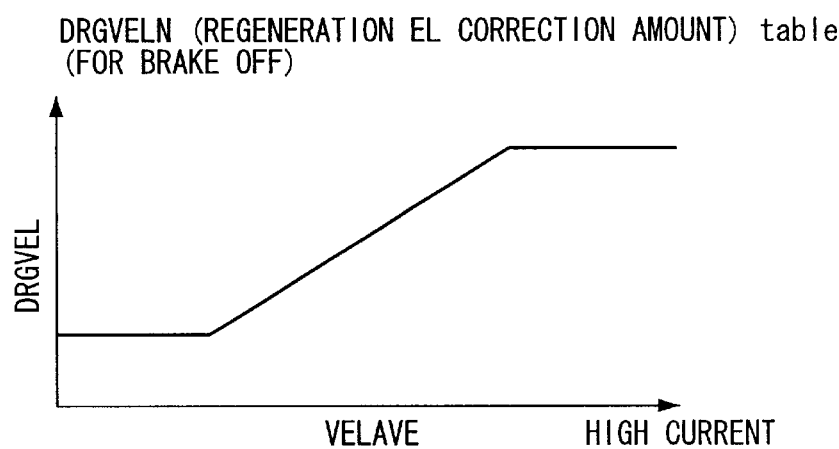
FIG. 34 is a graph for obtaining deceleration regeneration correction amount depending on the 12V system electric power consumption when a brake is off.

In step S403 a deceleration regeneration correction amount DRGVEL is looked up for the average consumption current VELAVE from a #DRGVELN table as shown in FIG. 34, and the flow proceeds to step S404. In step S404 it is determined whether the control vehicle speed VP is greater than or equal to a predetermined value #VPRGELL (for example 20 km/h). In the case where it is greater than or equal to the predetermined value #VPRGELL, the flow proceeds to step S405, and in the case where it is less than the predetermined value #VPRGELL, the flow proceeds to step S408.

In step S405 it is determined whether the control vehicle speed VP is less than or equal to a predetermined value #VPRGELH (for example 90 km/h). In the case where it is less than or equal to the predetermined value #VPRGELH, the flow proceeds to step S406, and in the case where it is greater than the predetermined value #VPRGELH, the flow proceeds to step S408. In step S406 it is determined whether the engine speed NE is greater than or equal to a predetermined value #NPRGELL. In the case where it is greater than or equal to the predetermined value #NPRGELL, the flow proceeds to step S407, and in the case where it is less than the predetermined value #NPRGELL, the flow proceeds to step S408.

In step S407 the deceleration regeneration correction amount DRGVEL is added to the deceleration regeneration computed value DECRGN, and the flow proceeds to step S408. In this manner, in the case where the 12V system current consumption is high, the deceleration regeneration amount is increased to maintain the supply amount of regeneration amount to the battery 3.

Consequently, since the deceleration regeneration amount is corrected with consideration of the 12V system electric power consumption only in the case where the above mentioned control vehicle speed VP is within a certain range (between #VPRGELL and #VPRGELH), and the engine speed NE is equal to or less than a certain speed (#NPRGELL), deceleration perceived by the driver is not unpleasant, and it is possible to prevent deceleration regeneration more than is necessary. Here, the abovementioned predetermined value #VPRGELH, predetermined value #NPRGELL, and predetermined value #NPRGELL are values with hysteresis.

In step S408 it is determined whether an energy storage zone D flag F_ESZONED is "1". In the case where it is determined to be in zone D, the flow proceeds to step S409, and it is determined whether a deceleration regeneration permission flag F_DECRGN is "1". In the case where the determination result of step S409 is "NO", that is, there is no deceleration regeneration permission, in step S415 a "0" is set to the deceleration regeneration final computed value DECRGNF, in step S416 a "0" is set to the deceleration regeneration permission flag F_DECRGN, in step S426 the deceleration regeneration final computed value DECRGNF (=0) is assigned to the final charge instruction value REGENF, in step S427 a "0" is set to the final assistance instruction value, and control terminates.

In the case where the determination result of step S409 is "YES", that is, it is determined that there is deceleration regeneration permission, in step S410 it is determined whether the previous mode was deceleration mode. In the case where it is determined that the previous mode was not deceleration mode, the flow proceeds to step S415. In the case where it is determined that the previous mode was deceleration mode, the flow proceeds to step S411, and it is determined whether the gradual subtraction update timer TDECRND is "0". In the case where it is determined in step S411 that the gradual subtraction update timer TDECRND is not "0", in step S425 a "1" is set to the deceleration regeneration permission flag F_DECRGN, and the flow proceeds to step S426.

In the case where it is determined in step S411 that the gradual subtraction update timer TDECRND is "0", in step S412 a predetermined value #TMDECRND is set to the gradual subtraction update timer TDECRND, and the flow proceeds to step S413. In step S413 a gradual subtraction term #DDECRND is subtracted from the deceleration regeneration final computed value DECRGNF. In the case where the deceleration regeneration final computed value DECRGNF is less than or equal to "0" in step S414, the flow proceeds to step S415. In the case where the deceleration regeneration final computed value DECRGNF is greater than "0" in step S414, the flow proceeds to step S425.

Referring again to step S408 where it is determined whether the energy storage zone D flag F_ESZONED is "1". In the case where it is determined that it is not zone D, the flow proceeds to step S417. In step S417, it is determined whether the gradual addition/subtraction update timer TDECRGN is zero. In the case where the determination result is "NO", flow proceeds to step S425. On the other hand, in the case where the determination result is "YES", the flow proceeds to step S418, and then in step S418 a predetermined value #TMDECRGN is set to the gradual addition/subtraction update timer TDECRGN, and the flow proceeds to step S419. In step S419 it is determined whether the deceleration regeneration computed value DECRGN is greater than or equal to the deceleration regeneration final computed value DECRGNF.

In the case where the determination result of step S419 is "YES", in step S423 an gradual addition amount #DDECRNP is added to the deceleration regeneration final computed value DECRGNF, and in step S424 it is again determined whether the deceleration regeneration computed value DECRGN is greater than or equal to the deceleration regeneration final computed value DECRGNF. In the case where the determination result of step S424 is that the deceleration regeneration computed value DECRGN is greater than or equal to the deceleration regeneration final computed value DECRGNF, the flow proceeds to step S425.

In the case where the determination result of step S424 is that the deceleration regeneration computed value DECRGN is less than the deceleration regeneration final computed value DECRGNF, the flow proceeds to step S422, and the deceleration regeneration computed value DECRGN is assigned to the deceleration regeneration final computed value DECRGNF, and the flow proceeds to step S425.

In the case where the determination result of step S419 is "NO", in step S420 the gradual subtraction amount #DDECRNM is subtracted from the deceleration regeneration final computed; value DECRGNF. In step S421 it is determined whether the deceleration regeneration final computed value DECRGNF is greater than or equal to the deceleration regeneration computed value DECRGN. In the case where the determination result of step S421 is that the deceleration regeneration computed value DECRGN is greater than the deceleration regeneration final computed value DECRGNF, the flow proceeds to step S422. In the case where the determination result of step S421 is that the deceleration regeneration final computed value DECRGNF is greater than or equal to the deceleration regeneration computed value DECRGN, the flow proceeds to step S425.

Consequently, according to the abovementioned embodiment, in the deceleration mode, in the case where the control vehicle speed VP is within a predetermined range (step S404, step 8405), and the engine speed NE is greater than or equal to a predetermined speed (step S406), by increasing the regeneration amount in step S407, it is possible to maintain the amount to be directed to the 12V system via the downverter 5 depending on the current consumption of the 12V system. As a result, the battery remaining charge can be also sufficiently maintained at the time of deceleration regeneration.

Furthermore, in cruise mode, since the addition amount is looked up depending on the usage amount of the 12V electric power consumption in step S318, and increased in step S319, the increase of the generation amount in cruise mode makes it possible to control the reduction of the battery remaining charge by the increase of the 12V system current consumption. Furthermore, in the aforementioned cruise mode, in the case where the high current flag F_VELMAH is "1" in step S324, that is, the 12V system electric power consumption is high, since cruise battery supply mode in step S330, which supplies electric power to the auxiliary battery 4 from the battery 3, and cruise generation stop mode in step S329 are basically inhibited, in this manner it is also possible to control the reduction of the battery remaining charge in the case where the 12V system electric power consumption is high in cruise mode.

Moreover, to make the counter plan for the case where the 12V current consumption in the abovementioned cruise mode is high effective, with step S158, step S169 and step S198 for adding the correction term in the assistance trigger determination in acceleration mode, the frequency of acceleration mode is decreased and the frequency of cruise mode is increased so that it is possible to aim to increase the battery remaining charge. Here, when the correction amount for the abovementioned assistance trigger is set, a coefficient depending on the vehicle speed (step S157, step S168 and step S197) is set. Consequently, the assistance frequency is intended to be decreased in a low vehicle speed zone where starting and stopping increase due to congestion and the like. Therefore, it is possible to prevent a reduction of the battery remaining charge at a time of low vehicle speed when charge is difficult to maintain during cruising.

This invention may be embodied in other forms or carried out in other ways without departing from the spirit thereof. The present embodiment is therefore to be considered in all respects illustrative and not limiting, the scope of the invention being indicated by the appended claims, and all modifications falling within the meaning and range of equivalency are intended to be embraced therein.

What is claimed is:

1. A control apparatus for a hybrid vehicle which is provided with: an engine for outputting a driving force for a vehicle; a motor for assisting the output from said engine; a high voltage power storage unit for supplying electric power to said motor; a voltage converter for lowering the voltage of said high voltage power storage unit to enable supply of electric power to a low voltage system such as a low voltage power storage unit and engine accessories; an output assistance determining device for determining, on the basis of a determination threshold value, approval or denial of output assistance of said engine by said motor, depending on the driving conditions of said vehicle; an output assistance controller for, when said output assistance determining device determines that output assistance of said engine by said motor is performed, setting the control amount of said motor to perform output assistance of said engine by said motor; a generation controller for, when said output assistance determining device determines that output assistance of said engine by said motor is not performed, setting the generation amount by said motor to perform generation by said motor; and a regeneration controller for setting a regeneration amount by said motor at the time of vehicle deceleration, to perform regeneration by said motor on the basis of said regeneration amount, said control apparatus comprising:

a vehicle speed detector;

an engine speed detector for detecting the engine speed of said engine;

an electric power computing device for computing the electric power consumption of said low voltage system;

a regeneration amount increasing device for, when the vehicle speed detected by said vehicle speed detector is within a predetermined range, and said engine speed detected by said engine speed detector is greater than a predetermined speed, increasing said regeneration amount set by said regeneration controller, depending on said electric power consumption of said low voltage system; and a generation amount increasing device for increasing said generation amount set by said generation controller, depending on said electric power consumption of said low voltage system.

2. A control apparatus for a hybrid vehicle according to claim 1, further comprising:

a high electric power consumption determining device for determining whether a situation in which the electric power consumption of said low voltage system exceeding a predetermined value has continued for a certain duration; and a determination threshold value correcting device for, when it is determined by said high electric power consumption determining device that a situation in which said electric power consumption of said low voltage system exceeding a predetermined value has continued for a certain duration, raising said determination threshold value which is the basis of approval or denial of output assistance by said output assistance determining device, depending on said electric power consumption of said low voltage system.

3. A control apparatus for a hybrid vehicle according to claim 2, wherein the determination threshold value to be corrected by said determination threshold value correcting device is corrected depending on the vehicle speed detected by said vehicle speed detector.

4. A control apparatus for a hybrid vehicle according to claim 1, wherein said electric power consumption of said low voltage system is computed from the electric power downstream of said high voltage power storage unit and upstream of said voltage converter.

5. A control apparatus for a hybrid vehicle according to claim 1, wherein said electric power consumption of said low voltage system is computed from the difference in electric power between the upstream and downstream of said high voltage power storage unit.

6. A control apparatus for a hybrid vehicle according to claim 1, wherein said electric power consumption of said low voltage system is computed from an ammeter used in a fuel injection system and a voltage of said low voltage power storage unit.

* * * * *